(12) United States Patent
Nagao et al.

(10) Patent No.: US 7,590,765 B2
(45) Date of Patent: Sep. 15, 2009

(54) BULK DATA TRANSFER AND BUFFER CONTROL DEVICE AND ELECTRONIC INSTRUMENT

(75) Inventors: Kenyou Nagao, Sapporo (JP); Shun Oshita, Sapporo (JP); Shuichi Yanagihara, Sapporo (JP); Yuji Mikami, Sapporo (JP)

(73) Assignee: Seiko Epson Corporation, Tokyo (JP)

( * ) Notice: Subject to any disclaimer, the term of this patent is extended or adjusted under 35 U.S.C. 154(b) by 288 days.

(21) Appl. No.: 11/338,733

(22) Filed: Jan. 25, 2006

(65) Prior Publication Data

US 2006/0179202 A1 Aug. 10, 2006

(30) Foreign Application Priority Data

Feb. 4, 2005 (JP) ............... 2005-029225

(51) Int. Cl.
G06F 3/00 (2006.01)
G06F 13/00 (2006.01)

(52) U.S. Cl. .......................... 710/5; 710/100
(58) Field of Classification Search ............ 710/5, 710/100
See application file for complete search history.

(56) References Cited

U.S. PATENT DOCUMENTS 7,007,112 B2 * 2/2006 Ishida et al. ............ 710/52

2002/0167851 A1 11/2002 Ishida et al.
2002/0169904 A1 * 11/2002 Kamihara et al. ........... 710/100
2002/0169905 A1 * 11/2002 Ishida et al. ............... 710/100

FOREIGN PATENT DOCUMENTS

JP A 2002-344537 11/2002
JP A 2003-323391 11/2003

OTHER PUBLICATIONS

Definition of 'macro instruction', 2000, Collins English Dictionary.*
Definition of 'macro instruction', 1998, Wiley Dictionary of Communications Technology.*

* cited by examiner

*Primary Examiner*—Henry W. H. Tsai
*Assistant Examiner*—Hyun Nam
(74) *Attorney, Agent, or Firm*—Oliff & Berridge, PLC

(57) ABSTRACT

A data transfer control device for transferring data via a bus includes a buffer controller for controlling access to a data buffer in which a command block area, a data area and status block area are prepared, and a transfer controller for controlling data transfer. The transfer controller executes, a transaction of bulk OUT transfer in a command transport to automatically send a packet including command block data written in the command block area in response to an instruction to execute automatic bulk transfer, a transaction of one of bulk OUT transfer and bulk IN transfer in a data transport to automatically execute one of sending a packet including sending data written in the data area and receiving a packet including receiving data to be written in the data area, and a transaction of bulk IN transfer in a status transport to automatically receive a packet including status block data to be written in the status block area.

13 Claims, 20 Drawing Sheets

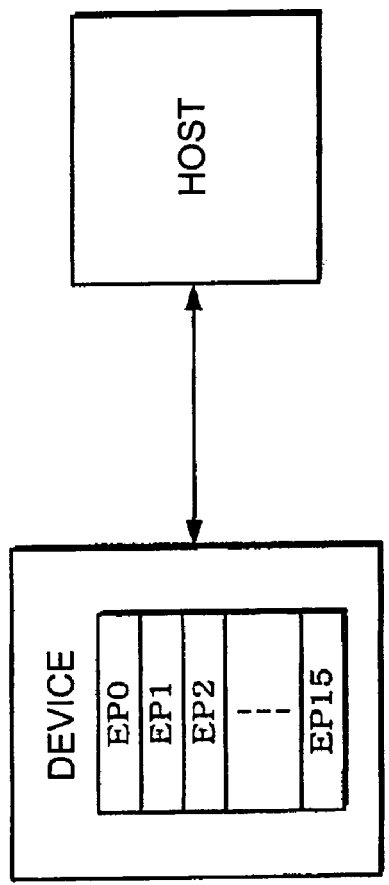
FIG. 1A
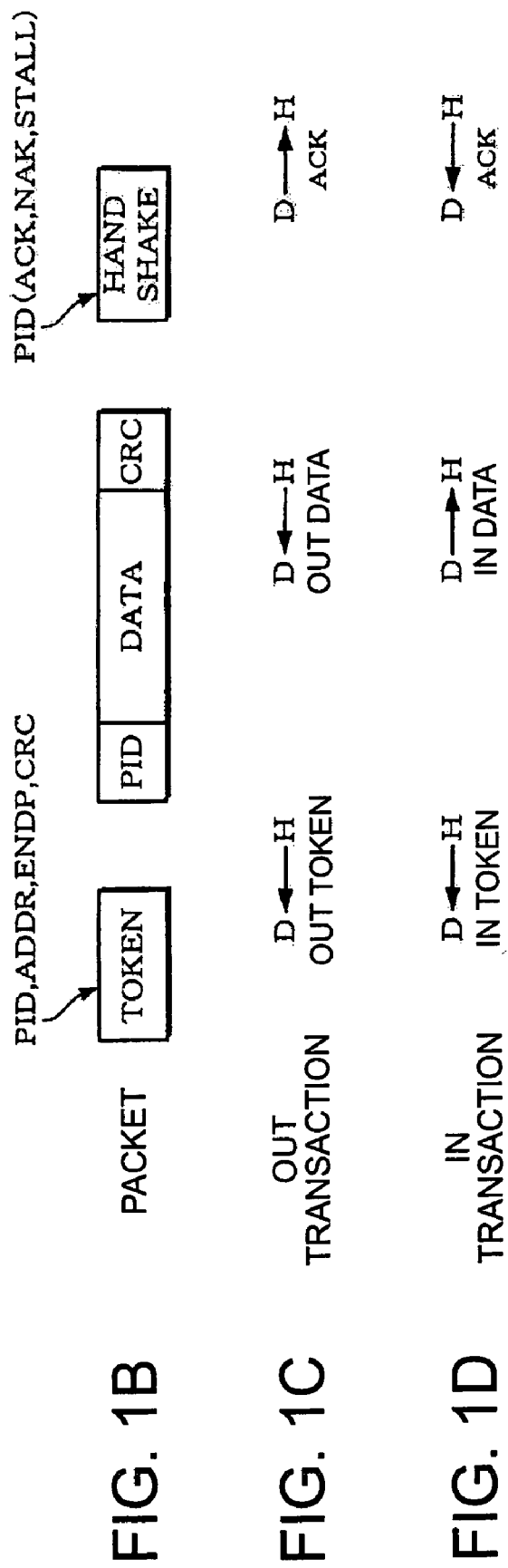
FIG. 1B
FIG. 1C
FIG. 1D

EP0 (CONTROL)     CONTROL

EP1 (BULK OUT)     CBW, BULK OUT DATA

EP2 (BULK IN)     CSW, BULK IN DATA

FIG. 2A

| BIT / BYTE | 7 | 6 | 5 | 4 | 3 | 2 | 1 | 0 |
|---|---|---|---|---|---|---|---|---|
| 0~3 | dCBWSignature ||||||||
| 4~7 | dCBWTag ||||||||
| 8~11 | dCBWDataTransferLength ||||||||
| 12 | bmCBWFlags ||||||||
| 13 | RESERVED (0) |||| bCBWLUN ||||
| 14 | RESERVED (0) ||||| bCBWCBLength |||
| 15~30 | CBWCB ||||||||

FIG. 2B

| BIT / BYTE | 7 | 6 | 5 | 4 | 3 | 2 | 1 | 0 |
|---|---|---|---|---|---|---|---|---|
| 0~3 | dCSWSignature ||||||||
| 4~7 | dCSWTag ||||||||
| 8~11 | dCSWDataResidue ||||||||
| 12 | bCSWStatus ||||||||

CSW

FIG. 2C

FIG.10 COMPARATIVE EXAMPLE

| REGISTER | FUNCTION |
|---|---|
| BULK-ONLY SUPPORT EXECUTION | INSTRUCTING EXECUTION OF BULK-ONLY SUPPORT TRANSFER (AUTOMATIC BULK TRANSFER) |
| CBW ENABLE | INDICATING THAT SETTING OF CBW AREA IS ENABLED |
| SET CBW ENABLE | SETTING CBW ENABLE |
| CLEAR CBW ENABLE | CLEARING CBW ENABLE |
| OUT ENDPOINT TOGGLE SEQUENCE | SETTING INITIAL VALUE OF TOGGLE SEQUENCE BIT OF OUT ENDPOINT |
| OUT ENDPOINT NUMBER | SETTING ENDPOINT NUMBER OF OUT ENDPOINT |
| IN ENDPOINT TOGGLE SEQUENCE | SETTING INITIAL VALUE OF TOGGLE SEQUENCE BIT OF IN ENDPOINT |
| IN ENDPOINT NUMBER | SETTING ENDPOINT NUMBER OF IN ENDPOINT |
| BULK-ONLY SUPPORT EXECUTION RESULTS | SHOWING EXECUTION RESULTS OF BULK-ONLY SUPPORT TRANSFER |
| TRANSACTION STATUS | SHOWING TRANSACTION RESULTS |
| TRANSACTION CONDITION CODE | SHOWING DETAIL OF TRANSACTION RESULTS |
| TRANSPORT STATUS | INDICATING TRANSPORT IN PROGRESS<br>INDICATING TRANSPORT IN WHICH ERROR OCCURS WHEN TRANSPORT IS CANCELED WITH ERROR |

FIG. 13

BULK DATA TRANSFER AND BUFFER CONTROL DEVICE AND ELECTRONIC INSTRUMENT

BACKGROUND OF THE INVENTION

1. Technical Field

The present invention relates to a data transfer control device and an electronic instrument.

2. Related Art

Devices implementing universal serial bus (USB) are categorized into various classes. And, large capacity storage devices such as hard disc drives (HDD) or optical disc drives (e.g., DVD) belong to a class called mass storage, and a protocol called bulk-only transport is laid down in the mass storage class as a standard. JP-A-2002-344537 discloses related art for making the data transfer control in the bulk-only transport more efficient.

However, the related art is for enhancing efficiency of the data transfer control in the device side of USB, and the document mentioned above does not disclose how to make the data transfer control in the host side more efficient.

Further, in recent years, it is strongly desired that peripheral devices such as cellular phones of portable audio instruments are provided with the host functions. Therefore, how to enhance the efficiency in the data transfer control of the bulk-only transport becomes a problem also in the host side.

SUMMARY

In view of the technical problem described above, an advantage of the invention is to provide a data transfer control device and an electronic instrument capable of carrying out efficient data transfer control.

The data transfer control device according to an aspect of the invention is a device for transferring data via a bus, and includes a buffer controller for controlling access of a data buffer in which a command block area, a data area and status block area are prepared, and a transfer controller for controlling data transfer. The transfer controller executes a transaction of bulk OUT transfer in a command transport to automatically send a packet including command block data written in the command block area in response to an instruction to execute automatic bulk transfer. And the transfer controller then executes a transaction of bulk OUT transfer or bulk IN transfer in a data transport to automatically execute sending a packet including sending data written in the data area or receiving a packet including receiving data to be written in the data area. And, the transfer controller then executes a transaction of bulk IN transfer in a status transport to automatically receive a packet including status block data to be written in the status block area.

According to this aspect of the invention, when the instruction on executing the automatic bulk transfer is issued by a processing section (firmware) or the like, the transactions of the command transport, the data transport (if the data transport is present), and the status transport are automatically executed, thus the packet necessary for the transaction of each transport is automatically (without any help of firmware) sent or received. As described above, according to this aspect of the invention, a series of processes from commencement of the command transport to completion of the status transport are automatically executed by the transfer controller only by instructing to execute the automatic bulk transfer. Therefore, the processing load of the processing section or the like can be reduced in comparison with a method in which the processing section instructs to commence execution for each transport.

Further, in another aspect of the invention, the transfer controller can control a transaction of the data transport based on the command block data written in the command block area.

By thus processed, the transaction in the data transport can be controlled based on the command block data without executing individual setting regarding the data transport, thus the processing load of the processing section can further be reduced.

Further, in the data transfer control device according to another aspect of the invention, the transfer controller can execute a transaction of the status transport omitting execution of a transaction of the data transport in accordance with a data transfer length of the command block data set to zero By thus controlled, whether the data transport is present of absent can be judged by a simple process.

Further, in the data transfer control device according to another aspect of the invention, the transfer controller can decide, based on the command block data, which one of a transaction of the bulk OUT transfer and a transaction of the bulk IN transfer is executed in the data transport.

Thus, the transaction control in the data transport can be simplified.

Further, the data transfer control device according to another aspect of the invention can further include a channel information register to which channel information of a channel area prepared in the data buffer is set, the data area being prepared as the channel area, the channel information including a maximum packet size and a function address of a device. In this case, the transfer controller executes the automatic bulk transfer based on the channel information set in the channel information register.

By thus configured, the channel information can commonly be used in, for example, the bulk OUT transfer and the bulk IN transfer, thus the process can be made efficient and the scale of the device can be reduced.

Further, the data transfer control device according to another aspect of the invention can further include an automatic bulk transfer information register to which an OUT endpoint number for designating an endpoint of the bulk OUT transfer and an IN endpoint number for designating an endpoint of the bulk IN transfer are set as automatic bulk transfer information. In this case, the transfer controller automatically sends a packet including the sending data to the endpoint designated by the OUT endpoint number if the transaction of the bulk OUT transfer is executed in the data transport. Further, the transfer control device automatically receives a packet including the receiving data from the endpoint designated by the IN endpoint number if the transaction of the bulk IN transfer is executed in the data transport.

Thus, the transaction control in the data transport can be simplified.

Further, the data transfer control device according to another aspect of the invention can further include an analyzing circuit for analyzing the status block data received in the status transport to detect an error in the status block data.

By thus configured, the processing load of analyzing the status block data and detecting an error by the processing section or the like can be reduced.

Further, the data transfer control device according to another aspect of the invention can further include a processing section, and the analyzing circuit can notify the processing section of the error in the status block data if the error is detected in either of a plurality of fields of the status block data.

By thus configured, the error detection process can be carried out by the analyzing circuit with a simple and small-sized configuration.

Further, in the data transfer control device according to another aspect of the invention, the processing section can analyze the status block data written in the status block area in response to the notification of the error in the status block data.

By thus configured, the analysis of the status block data and the error detection process can efficiently be shared by the transfer control device and the processing section.

Further, in the data transfer control device according to another aspect of the invention, upon detection of a transaction error in either one of the command transport, the data transport, and the status transport, the transfer controller can stop executing the automatic bulk transfer and notify the processing section of the transport in which the transaction error occurs.

By thus configured, an appropriate measure can be taken to the transaction error occurring in each transport.

Further, in the data transfer control device according to another aspect of the invention, the command block area can include a first command block area and a second command block area. In this case, while the processing section is writing the command block data to either one of the first and the second command block areas, the transfer controller can execute the automatic bulk transfer based on the command block data written in the other of the first and the second command block areas.

By thus configured, the data transfer can be made efficient, and the processing load of the processing section or the like can be reduced.

Further, in the data transfer control device according to another aspect of the invention, the transfer controller can include the following circuits. A first circuit is for instructing to commence a transaction of the bulk OUT transfer in the command transport in response to an instruction on execution of the automatic bulk transfer.

A second circuit is for selecting either one of execution of a transaction of the bulk OUT transfer in the data transport, execution of a transaction of the bulk IN transfer in the data transport, or no execution of the data transport based on information of a transfer direction of the data transport and information regarding presence or absence of the data transport in response to completion of the transaction of the bulk OUT transfer in the data transport commenced by the first circuit.

A third circuit is for instructing to commence a transaction of the bulk OUT transfer of the data transport in response to selection of executing the transaction of the bulk OUT transfer in the data transport, and for instructing to commence a transaction of the bulk IN transfer in the data transport in response to selection of executing the transaction of the bulk IN transfer in the data transport.

A fourth circuit is for instructing to commence a transaction of the bulk IN transfer in the command transport in response to completion of the transaction of the bulk OUT transfer or the transaction of the bulk IN transfer in the data transport commenced by the third circuit.

Further, in the data transfer control device according to another aspect of the invention, the bus can be USB (Universal Serial Bus), and the command transport, the data transport, and the status transport can be compliant to the bulk-only transport standard of the mass storage class.

Further, an electronic instrument according to another aspect of the invention includes the data transfer control device according to one of the above aspects of the invention, and a storage device for storing data transferred by the data transfer control device.

BRIEF DESCRIPTION OF THE DRAWINGS

The invention will now be described with reference to the accompanying drawings, wherein like numbers refer to like elements.

FIGS. 1A through 1D are charts for explaining data transfer in USB.

FIGS. 2A through 2C are charts for explaining the bulk-only transport.

FIG. 13 is a diagram for explaining registers used in the present embodiment and functions of the registers.

DESCRIPTION OF THE EMBODIMENTS

Figure 3A:
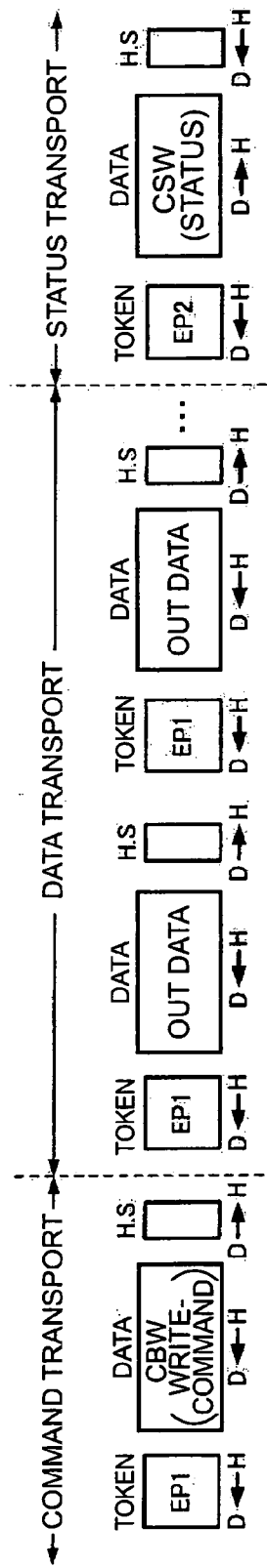
FIGS. 3A and 3B are charts also for explaining the bulk-only transport.

Hereinafter, embodiments of the present invention will be described in detail. Note that the present embodiment described below does not unreasonably limit contents of the invention as claimed in the document. Further, not all the elements described in the present embodiment are necessary for the invention as means for solving the problem.

1. USB

Firstly, data transfer in USB will be described. In USB, endpoints (EP0 through EP15) shown FIG. 1A are prepared in the device (USB device) side. The host can freely send data to or receive data from a desired endpoint by designating a function address and a number of the endpoint of the device.

In USB, as types of transfer, control transfer, isochronous transfer, interrupt transfer, bulk transfer, and so on are defined. The control transfer is a mode of transfer for control performed between the host and the device (target) via the endpoint 0. The isochronous transfer is a mode of transfer prepared for periodically transferring image or audio data. The interrupt transfer is a mode of transfer prepared for periodically transferring a small amount of data in a relatively low transfer speed. The bulk transfer is a mode of transfer prepared for transferring a large amount of data generated on an irregular base.

Each of these modes of transfer is composed of a series of transactions. And, each of the transactions is composed of a token packet, an optional data packet, and an optional handshake packet as shown in FIG. 1B.

In an OUT transaction (the transaction in which the host outputs data to the device), as shown in FIG. 1C, the host firstly issues an OUT token (a token packet) to the device. Subsequently, the host sends OUT data (a data packet) to the device. And, the device successfully receiving the OUT data sends an ACK (a handshake packet) to the host. With the above sequence, the process in which the host outputs data to the device can be carried out.

In contrast, in an IN transaction (the transaction in which the host inputs data from the device), as shown in FIG. 1D, the host firstly issues an IN token to the device. And then, the device receiving the IN token sends IN data to the host. And, the host successfully receiving the IN data then sends an ACK to the device. With the above sequence, the process in which the host inputs data from the device can be carried out.

Note that, in FIGS. 1C and 1D, "D<-H" means that information is transferred from the host to the device, and "D->H" means that information is transferred from the device to the host.

2. Bulk-Only Transport

Now, the protocol of the bulk-only transport in USB will be described. Large capacity storage devices such as hard disc drives or optical disc drives belong to the class called mass storage. The protocol called bulk-only transport is laid down in the mass storage class as a standard.

In the bulk-only transport, the packet transfer is executed using two endpoints, namely a bulk IN and a bulk OUT. That is, 31 bytes of data called CBW (Command Block Wrapper) is used as a command, and is transferred using the endpoint of the bulk OUT. In transferring data, either one of the endpoints of the bulk IN and the bulk OUT is used in accordance with the transfer direction. As a status responsive to the command, 13 bytes of data called CSW (Command Status Wrapper) is used, and is transferred using the endpoint of the bulk IN. Specifically, as shown in FIG. 2A, the device (USB device) is provided with the endpoints EP0, EP1, and EP2 respectively of the control, the bulk OUT, and the bulk IN. The control transfer is performed in the endpoint EP0. In the endpoint EP1, transfer of the CBW data (in a broad sense, command block data) in the command transport and the bulk OUT data in the data transport is performed. In the endpoint EP2, transfer of the CSW data (in a broad sense, status block data) in the status transport and the bulk IN data in the data transport is performed.

A format of the CBW is shown in FIG. 2B. The host delivers its intentions (e.g., a read request or a write request) to the device using the CBW in the command transport. The CBW is a 31 bytes of data transferred using the endpoint of the bulk OUT.

In FIG. 2B, dCBWSignature is an identifier indicating the CBW. As a tag for the CBW, dCBWTag is used. The tag is used for linking the CBW with the CSW. The transfer length of data following the CBW is represented by dCBWDataTransferLength. If there is no data to be transferred, the value of the dCBWDataTransferLength is set to 0x00000000. The data transfer direction is indicated by bmCBWFlags. In the bmCBWFlags, only the bit 7 is used, and the transfer direction is set to the OUT direction if the bit 7 is 0, and is set to the IN direction if the bit 7 is 1. A logical unit number of the device indicating the destination of the CBW is set in dCBWLUN. The length of the valid command packet to be stored in the field of CBWCB is represented by bCBWCBLength. A command used for controlling a storage device is set in the CBWCB.

A format of the CSW is shown in FIG. 2C. The device sends the result (status) responsive to the command transport back to the host using the CSW of the status transport. The CSW is a 13 bytes of data transferred using the endpoint of the bulk IN.

In FIG. 2C, dCSWSignature is an identifier indicating the CSW. As a tag for the CSW, dCSWTag is used. Specifically, the same value as the dCBWTag of the CBW is set to the dCSWTag. The difference between the data transfer length (the number of bytes to be transferred) designated by the dCBWDataTransferLength of the CBW and the length of valid data actually transferred by the device is set in dCSWDataResidue. The value representing the result of the process of the command transport is set in bCSWStatus. In case of normal termination, the value of 0x00 is set in the bCSWStatus, while the value of 0x01 is set in case of termination with error. Further, in case of an error (a phase error) such as incorrect data transfer length or wrong transfer direction, the value of 0x02 is set therein.

Now, sending and receiving processes of the bulk-only transport will be described herein with reference to FIGS. 3A and 3B. As shown in FIG. 3A, when the host sends (outputs) data to the device, the command transport in which the host sends the CBW to the device is firstly executed. Specifically, the host sends a token packet designating the endpoint EP1 to the device, and then sends the CBW to the endpoint EP1 of the device. This CBW includes a write command. And, the command transport is completed when the handshake packet of ACK is sent from the device back to the host.

After the command transport is completed, the process advances to the data transport. In the data transport, the host firstly sends a token packet designating the endpoint EP1 to the device, and then sends the OUT data to the endpoint EP1 of the device. And, one transaction is completed when the handshake packet of ACK is sent from the device back to the host. And, the transaction described above is repeatedly executed until the length of the sent data reaches the value designated by the dCBWDataTransferLength (See FIG. 2B) of the CBW, and then the data transport is completed.

After the data transport is completed, the process advances to the status transport. In the status transport, the host firstly sends a token packet designating the endpoint EP2 to the device. Then, the device sends the CSW in the endpoint EP2 to the host. And, the status transport is completed when the handshake packet of ACK is sent from the host back to the device.

Figure 3B:
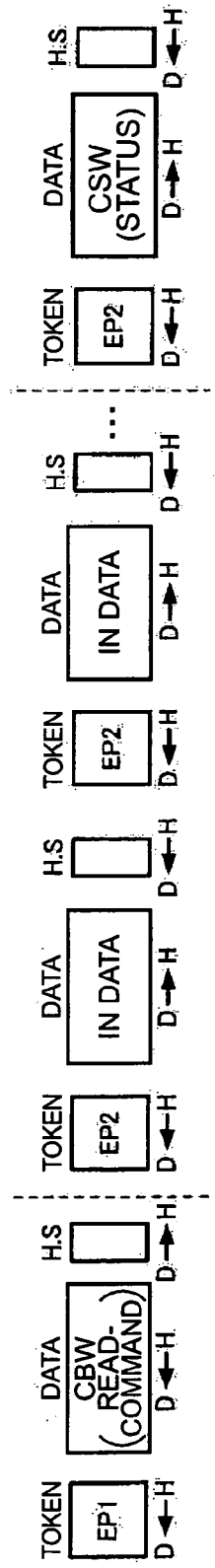

In contrast, as shown in FIG. 3B, when the host receives (inputs) data from the device, the host firstly sends a token packet designating the endpoint EP1 to the device, and then sends the CBW to the endpoint EP1 of the device. This CBW includes a read command. And, the command transport is completed when the handshake packet of ACK is sent from the device back to the host.

After the command transport is completed, the process advances to the data transport. In the data transport, the host firstly sends a token packet designating the endpoint EP2 to the device. And then the host receives the IN data in the endpoint EP2 of the device, and when the host sends the handshake packet of ACK back to the device, one transaction is completed. And, the transaction described above is repeatedly executed until the length of the sent data reaches the value designated by the dCBWDataTransferLength of the CBW, and then the data transport is completed.

After the data transport is completed, the process advances to the status transport. The process in the status transport is the same as the case of data sending process shown in FIG. 3A.

As described above, the bulk-only transport is composed of a number of transports, namely the command transport, the data transport, and the status transport. Therefore, the firmware runs on the CPU needs to perform setting of information and instructions of execution for each transport, thus increasing the processing load of the firmware. In particular, a CPU implemented in a cellular phone of a portable audio instrument (e.g., an HDD player) generally has a lower throughput compared to a CPU implemented in a PC (a personal computer). Therefore, the increased processing load of the firmware with respect to the bulk-only transport makes high speed data transfer difficult, and thus causes the total performance of the instrument to be degraded.

3. Configuration of Data Transfer Control Device

Figure 4:
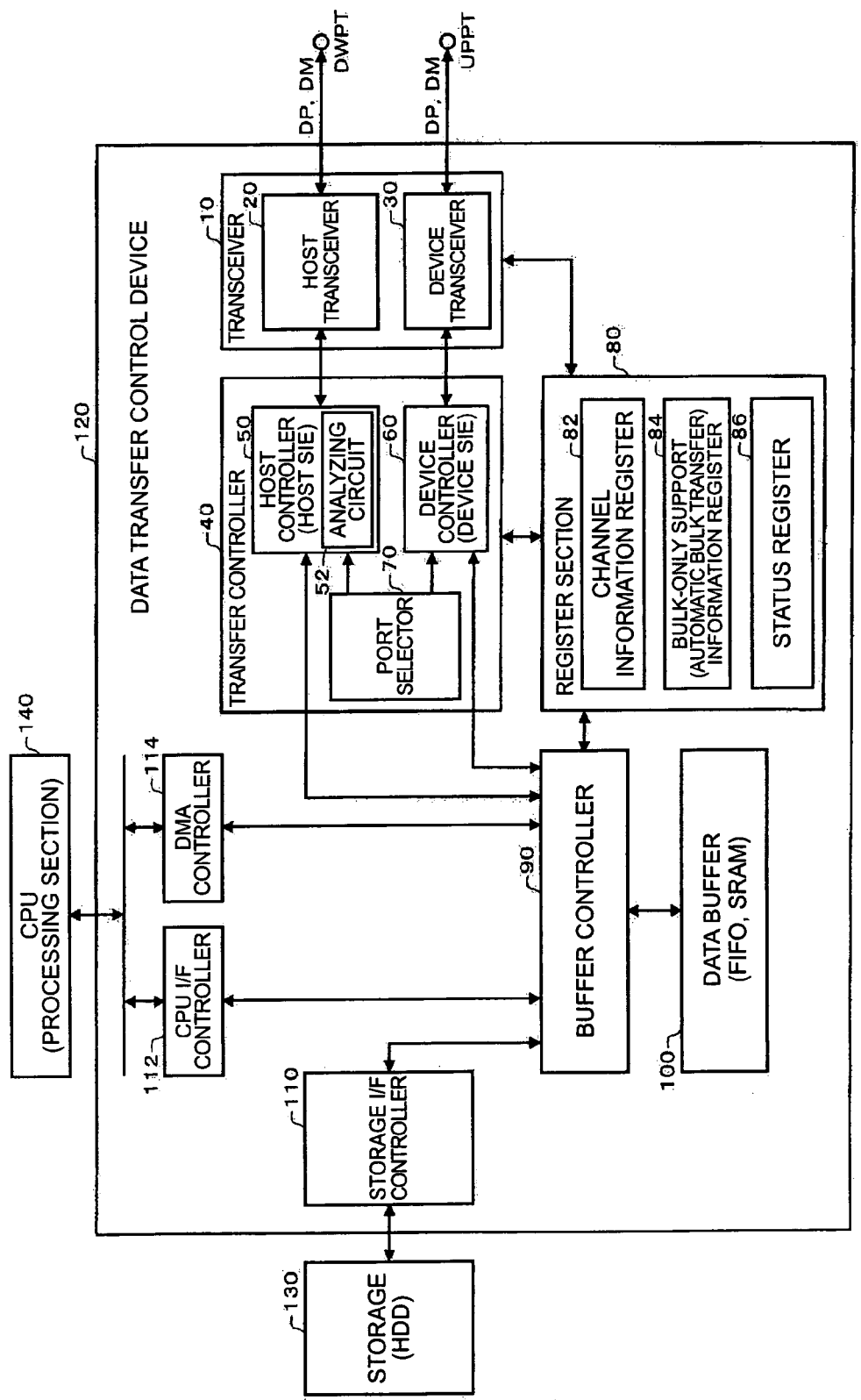
FIG. 4 is a block diagram of a configuration example of a data transfer control device according to an embodiment of the invention.

FIG. 4 shows a configuration of the data transfer control device according to the present embodiment capable of solving the problem described above. The data transfer control device 120 includes a transceiver 10, a transfer controller 40, a register section 80, a buffer controller 90, a data buffer 100, a storage I/F (interface) controller 110, a CPU I/F controller 112, and a DMA (Direct Memory Access) controller 114. Note that the data transfer control device 120 of the present embodiment can be configured with a part of these elements omitted. For example, the configuration without the transceiver 10 or the data buffer 100 can be adopted. Or, the configuration including a CPU 140 can also be adopted.

The transceiver 10 (a dual transceiver) is a circuit for sending or receiving data on USB (in a broad sense, a bus or a serial bus) using a differential signal (DP, MP), and includes a host transceiver 20 and a device transceiver 30.

The host transceiver 20 includes an analog front-end circuit (physical layer circuit) and a high-speed logic circuit, and supports the HS mode (480 Mbps), the FS mode (12 Mbps), and the LS mode (1.5 Mbps) of USB.

The device transceiver 30 includes an analog front-end circuit (physical layer circuit) and a high-speed logic circuit, and supports the HS mode and the FS mode. As the device transceiver 30, a circuit compliant with the UTMI (USB 2.0 Transceiver Macrocell Interface) specification can be used.

A transfer controller 40 is a controller for controlling data transfer via USB, and performs data transfer control in the transaction layer or the link layer. The transfer controller 40 includes a host controller 50, a device controller 60, and a port selector 70. Note that a configuration without a part of these elements can also be adopted.

The host controller 50 (a host serial interface engine) controls data transfer in the host mode. Specifically, the host controller 50 performs transaction scheduling (issuing), transaction management, generation and analysis of packets, and so on. Further, the host controller 50 also generates bus events such as Suspend, Resume, or Reset. Further, the host controller 50 also detects connection/disconnection condition of the bus and controls the VBUS.

The host controller 50 (in a broad sense, a transfer controller) includes an analyzing circuit 52. The analyzing circuit 52 (CBW analyzing circuit, CSW analyzing circuit) analyzes the CBW data (the command block data) written in the CBW area (the command block area). The transaction of the data transport is controlled in accordance with the result of the CBW data analysis. Further, the analyzing circuit 52 analyzes CSW data (the status block data) received in the status transport to detect an error in the CSW data. Specifically, if an error is detected in either of the plurality fields (dCSWSignature, dCSWTag, bCSWStatus shown in FIG. 2C) of the CSW data, the analyzing circuit 52 informs the CPU 140 (the firmware) of the error in the CSW data using an interrupt or the like. The CPU 140 then analyzes the CSW data written in the CSW area in further detail.

The device controller 60 (a device serial interface engine) controls data transfer in the device mode. Specifically, the device controller 60 performs transaction management, generation and analysis of packets, and so on. Further, the device controller 60 also controls bus events such as Suspend, Resume, or Reset.

The port selector 70 is a selector for selecting to validate either of the host mode or the device mode. The data transfer control device 120 shown in FIG. 4 is provided with both of an upstream port UPPT (in a broad sense, a first port) and a downstream port DWPT (in a broad sense, a second port). And, when the host mode is selected by, for example, setting of a register, the port selector 70 selects (enables) the host controller 50 and the host transceiver 20. And, the host controller 50 and the host transceiver 20 perform data communication with a device (another electronic instrument) connected to the downstream port DWPT.

Meanwhile, when the device mode is selected by, for example, setting of a register, the port selector 70 selects (enables) the device controller 60 and the device transceiver 30. And, the device controller 60 and the device transceiver 30 perform data communication with a host (another electronic instrument) connected to the upstream port UPPT.

The register section 80 includes a channel information register 82, a bulk-only support information register 84, and a status register 86. These registers can be composed of a memory such as a RAM or of flip-flops.

The channel information (information of each register) of the channel areas (plural register areas) prepared in a data buffer 100 is set in the channel information register 82. As the channel information (transfer setting information), the maximum packet size, a function address (a USB address) of a device connected to USB, a transfer speed, a toggle sequence bit, start addresses and end addresses of respective channel areas in the data buffer 100, and so on can be cited.

The bulk-only support information (in a broad sense, automatic bulk transfer information) necessary for the bulk-only support transfer is set in the bulk-only support information register 84. As the bulk-only support information, an OUT endpoint number for designating an endpoint of the bulk OUT transfer, an IN endpoint number for designating an endpoint of the bulk IN transfer, an OUT endpoint toggle sequence, an IN endpoint toggle sequence, and so on can be cited.

The status register 86 shows (indicates) various status information of the data transfer control device 120 and the data transfer operation. As the status information, an interrupt status (a cause of an interrupt) of completion of the bulk-only support, an interrupt status of halt of the bulk-only support, information indicating a transport in which an error has occurred, a condition code, an interrupt status of the change condition, and so on can be cited.

The buffer controller 90 performs a process of allocating areas (e.g., a channel area, an endpoint area) in the data buffer 100 or access control (write control and read control) to the data buffer 100. Specifically, the buffer controller 90 performs a process (e.g., setting of the start addresses and the stop addresses) for preparing the CBW area (the command block area), the channel area (the data area), and the CSW area (the status block area) in the data buffer 100. Further, the buffer controller 90 also performs pointer control and FIFO control of each the areas prepared in the data buffer 100.

The data buffer 100 (FIFO, packet buffer) is a buffer for temporally storing (buffering) the data (sent data, received data) transferred via USB (a serial bus). The data buffer 100 can be realized using a memory device such as a RAM.

The storage I/F controller 110 performs control of the I/F with a storage device 130 of the mass storage class such as an HDD. Specifically, the storage I/F controller 110 performs I/F control of IDE (ATA/ATAPI). Further, the CPU I/F controller 112 performs control of I/F with the CPU 140 (in a broad sense, a processing section). Thus, the access to the registers by the CPU 140, for example, can be executed. The DMA controller 114 performs DMA control in the CPU I/F. Thus, the access to the data buffer 100 by the CPU 140 can be executed.

4. Channel

Figure 5:
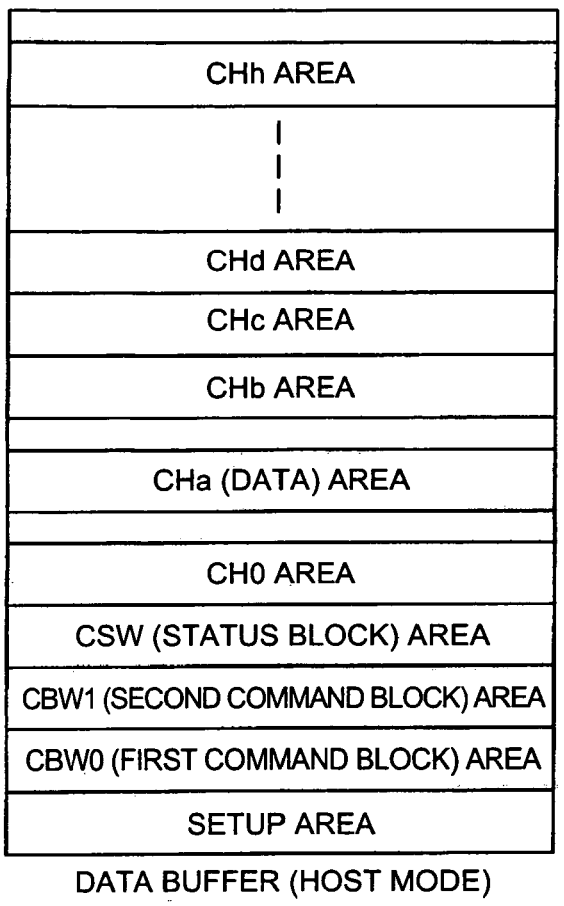
FIG. 5 is a diagram of an example of areas prepared in a data buffer during a host mode.
Figure 6:
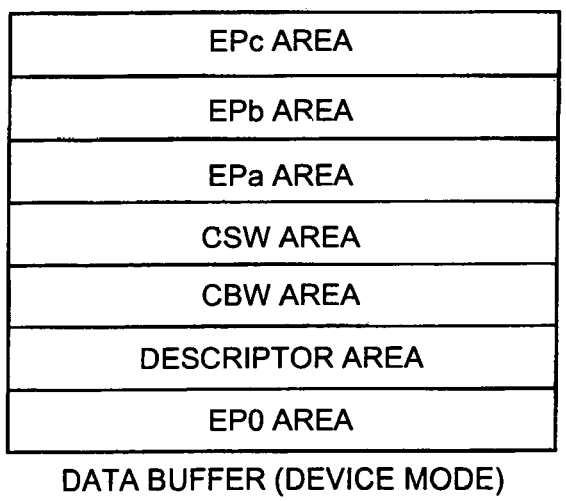
FIG. 6 is a diagram of an example of areas prepared in a data buffer during a device mode.

FIGS. 5 and 6 show an example of the areas prepared in the data buffer 100. As shown in FIG. 5, in the host mode, areas of SETUP, CBW0 (a first command block), CBW 1 (a second command block), CSW (the status block), and CH0, CHa through CHh (channels) are prepared in the data buffer 100. Here, SETUP, CBW0, CBW1, and CSW are the areas with fixed sizes. Further, CH0 and CHa through CHh are areas with sizes each variably set by the start address and the end address and are controlled as FIFOs. And, CH0 is an area used only for the control transfer. Further, CHa through CHc are areas used for the bulk transfer, CHd through CHf are areas used for the bulk and the interrupt transfer, and CHg, CHh are areas used for the bulk, the interrupt, and the isochronous transfer.

As shown in FIG. 6, in the device mode, the areas of EP0, EPa through EPc (endpoints), descriptor, CBW, and CSW are prepared in the data buffer 100.

In the specification, the channel area (a buffer area, a pipe area) in the host side in one-to-one correspondence with the pipe and various setting registers (channel information registers) for the transfer executed via the channel area are collectively called as "a channel." The transfer information (the channel information) is set in the channel in units of IRP (I/O Request Packet). And, the transfer of the data corresponding to the IRP is executed while automatically divided into a number of transactions based on the transfer information set therein. Since the channel can be switched by the IRP, the single channel can cope with a number of endpoints.

Specifically, the firmware (F/W) prepares the channel area and sets the transfer information (the channel information), and then instructs to execute the transfer. And, after instructing to execute the transfer, the firmware repeats the process of writing data in the channel area (in the OUT transfer process) or reading data from the channel area (in the IN transfer process) until the transfer of the data corresponding to the IRP is completed.

Meanwhile the hardware (H/W) performs transfer of the data as much as designated by the IRP while automatically dividing it into a number of transactions. And then, the hardware (the channel) informs the firmware by an interrupt when the transfer is completed.

Figure 7:
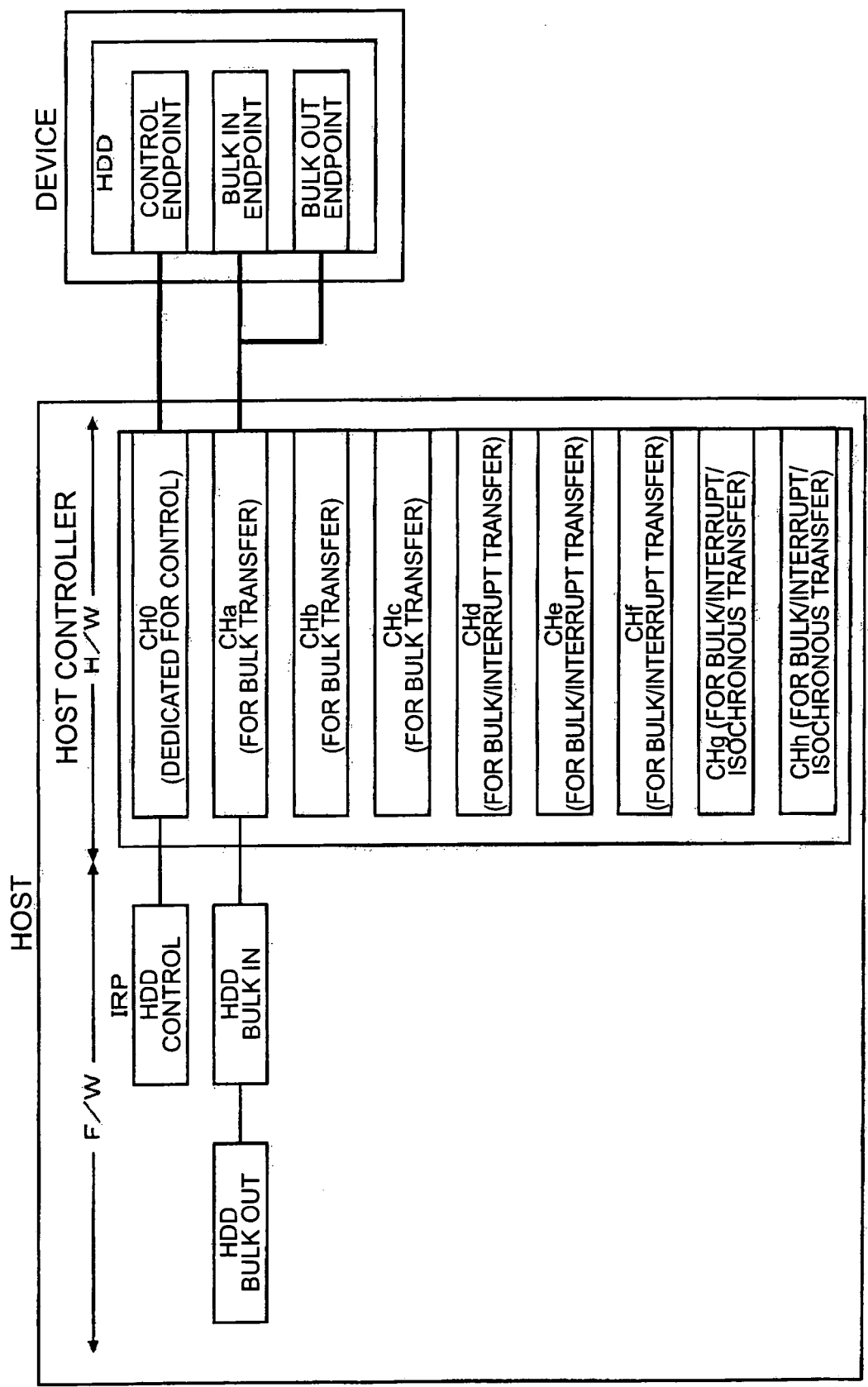
FIG. 7 is a diagram for explaining channel transfer.

FIG. 7 shows an example of how the channel is used when only one HDD, which is a storage device compliant to the bulk-only transport of USB, is connected to the data transfer control device. The control transfer is carried out using the channel CH0 dedicated to the control transfer. In contrast, the transfer in the bulk-only transport is carried out using the channel CHa for the bulk transfer (general purpose). Namely, the bulk IN transfer and the bulk OUT transfer are executed with the bulk IN and the bulk OUT endpoints, respectively, using the channel CHa.

Note that, although the case in which only one storage device (HDD) is connected to the data transfer control device is illustrated in FIG. 7, a number of storage devices can also be connected. In this case, the channel CH0 is commonly used (time-shared) by the storage devices in executing the control transfer. Further, the storage devices commonly use (in time-sharing) the cannel CHa to perform the data transfer in the bulk-only transport. In other words, it is arranged that the bulk IN transfer and the bulk OUT transfer with the bulk IN endpoint and the bulk OUT endpoint of the first storage device are executed using the channel CHa, and at the same time, the bulk IN transfer and the bulk OUT transfer with the bulk IN endpoint and the bulk OUT endpoint are also executed using the channel CHa.

Figure 8:
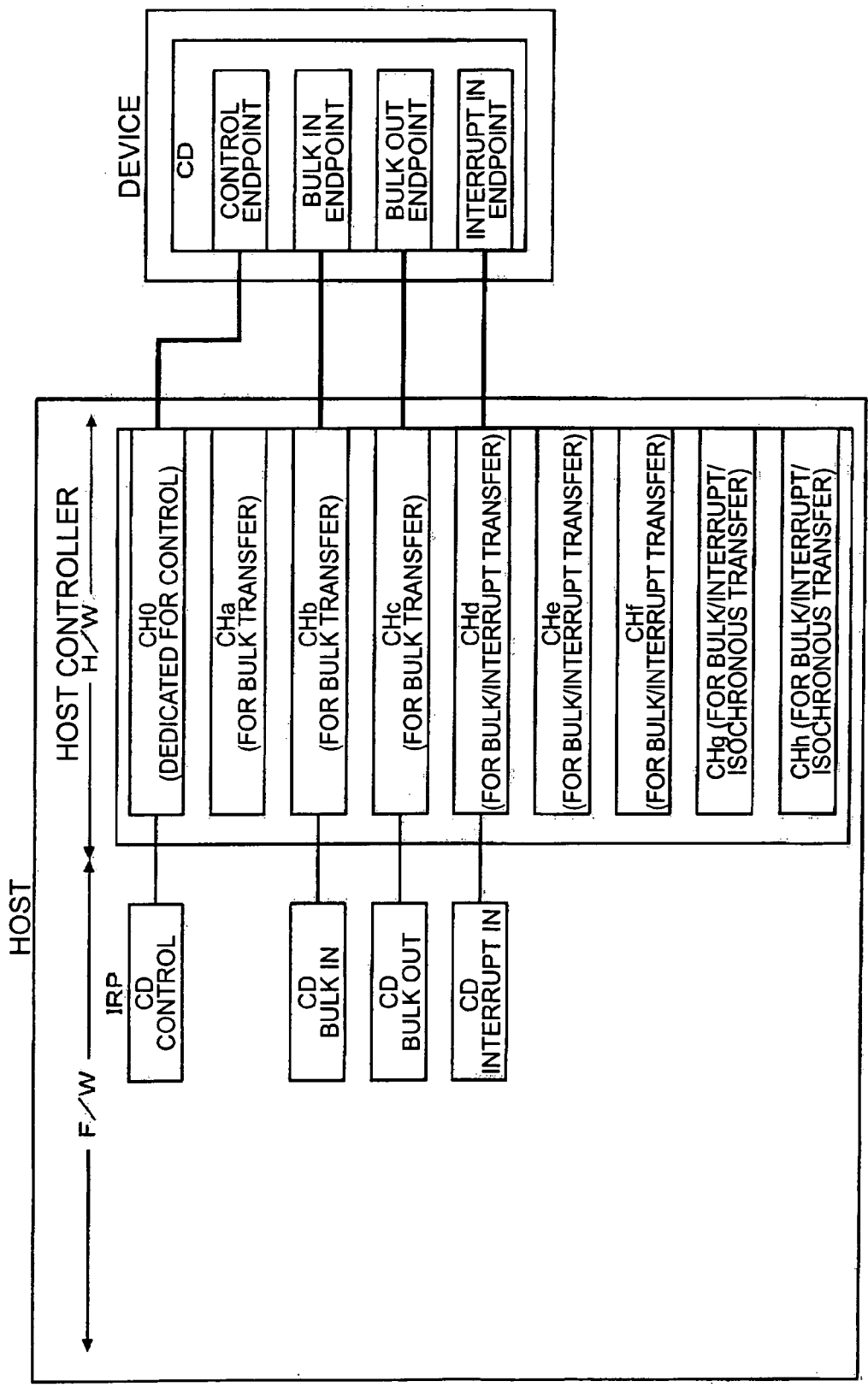
FIG. 8 is a diagram for explaining channel transfer.

Further, FIG. 8 shows an example of how the channel is used in the case in which a communication device CD (e.g., a wireless LAN adapter) compliant to the communication device class of USB is connected to the data transfer control device. In this case, the bulk IN transfer and the bulk OUT transfer are executed using the channels CHb and CHc, and the interrupt transfer is executed using the channel CHd.

5. Bulk-Only Support Transfer (Automatic Bulk Transfer)

Figure 9:
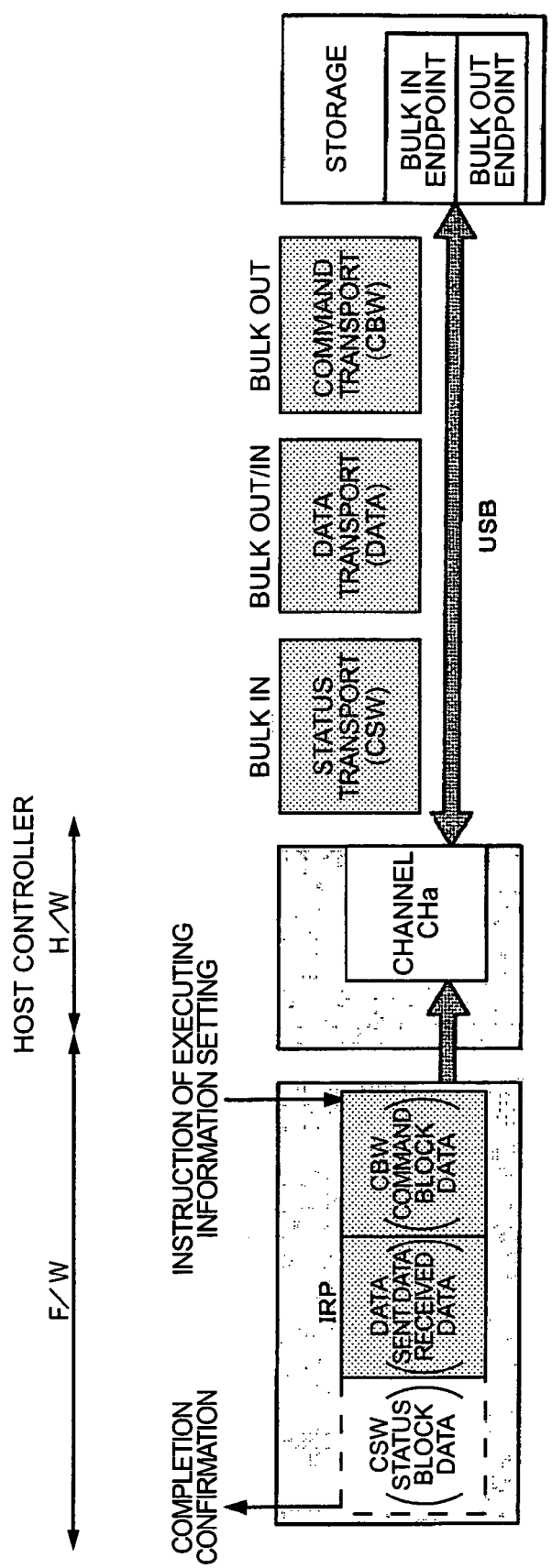
FIG. 9 is a diagram for explaining a transfer method in the bulk-only transport according to the present embodiment of the invention.

As shown in FIG. 9, the data transfer control device according to the present embodiment includes a function of automatically executing and managing the series of the command transport, the data transport, and the status transport of the bulk-only transport in USB.

Specifically, in the present embodiment, the CBW (the command block) area, the CHa (channel data) area, and the CSW (the status block) area are prepared in the data buffer 100. And, as shown in FIG. 9, when the firmware (F/W) sets the channel information and the bulk-only support information, and instructs to execute (commence) the bulk-only support transfer (the automatic bulk transfer), the host controller 50 (the transfer controller) executes (issues) the transaction of the bulk OUT transfer in the command transport to send the packet including the CBW data written in the CBW (CBW0, CBW1) area. Subsequently, the host controller 50 executes the transaction of the bulk OUT transfer or the bulk IN transfer in the data transport to send the packet including the sending data, which is written in the CHa area or to receive the packet including the receiving data, which is to be written in the CHa area. And then, the host controller 50 executes the transaction of the bulk IN transfer in the status transport to receive the packet including the CSW data to be written in the CSW area.

Figure 10:
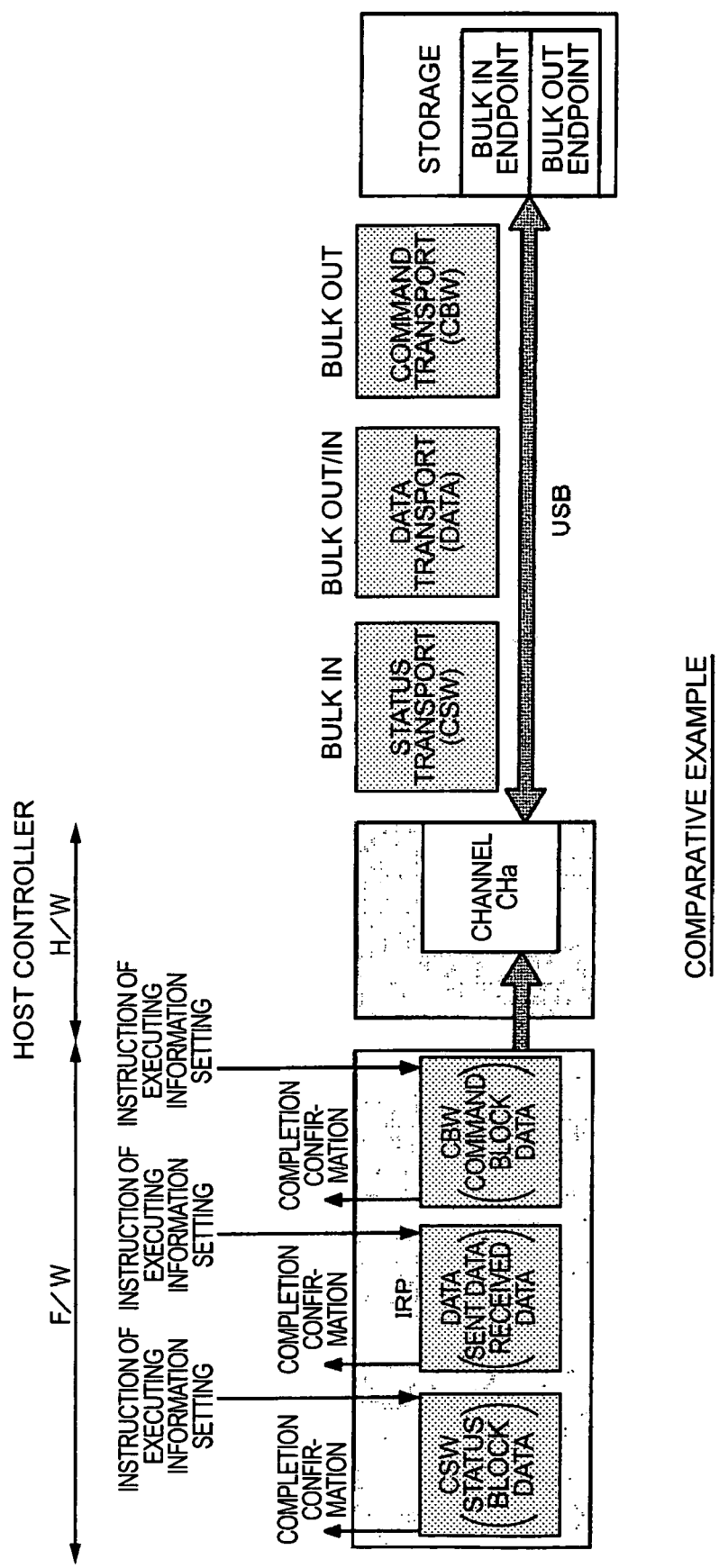
FIG. 10 is a diagram for explaining a transfer method of a comparative example.

FIG. 10 shows a method according to a comparative example of the present embodiment. In this comparative example, the firmware needs to execute setting of the information and instruction of the execution for each of the command transport, the data transport, and the status transport. Therefore, the processing load of the firmware increases.

On the contrary, according to the present embodiment shown in FIG. 9, since setting of the information and the instruction of the execution need not to be executed individually for each of the transport processes, the processing load of the firmware can be reduced. Therefore, if the host function is attempted to be implemented in a peripheral device equipped with a low performance CPU such as a cellular phone or a portable audio instrument, the data transfer control device best suited to be implemented in the peripheral device can be provided.

6. Detailed Process and Operation

Figure 11:
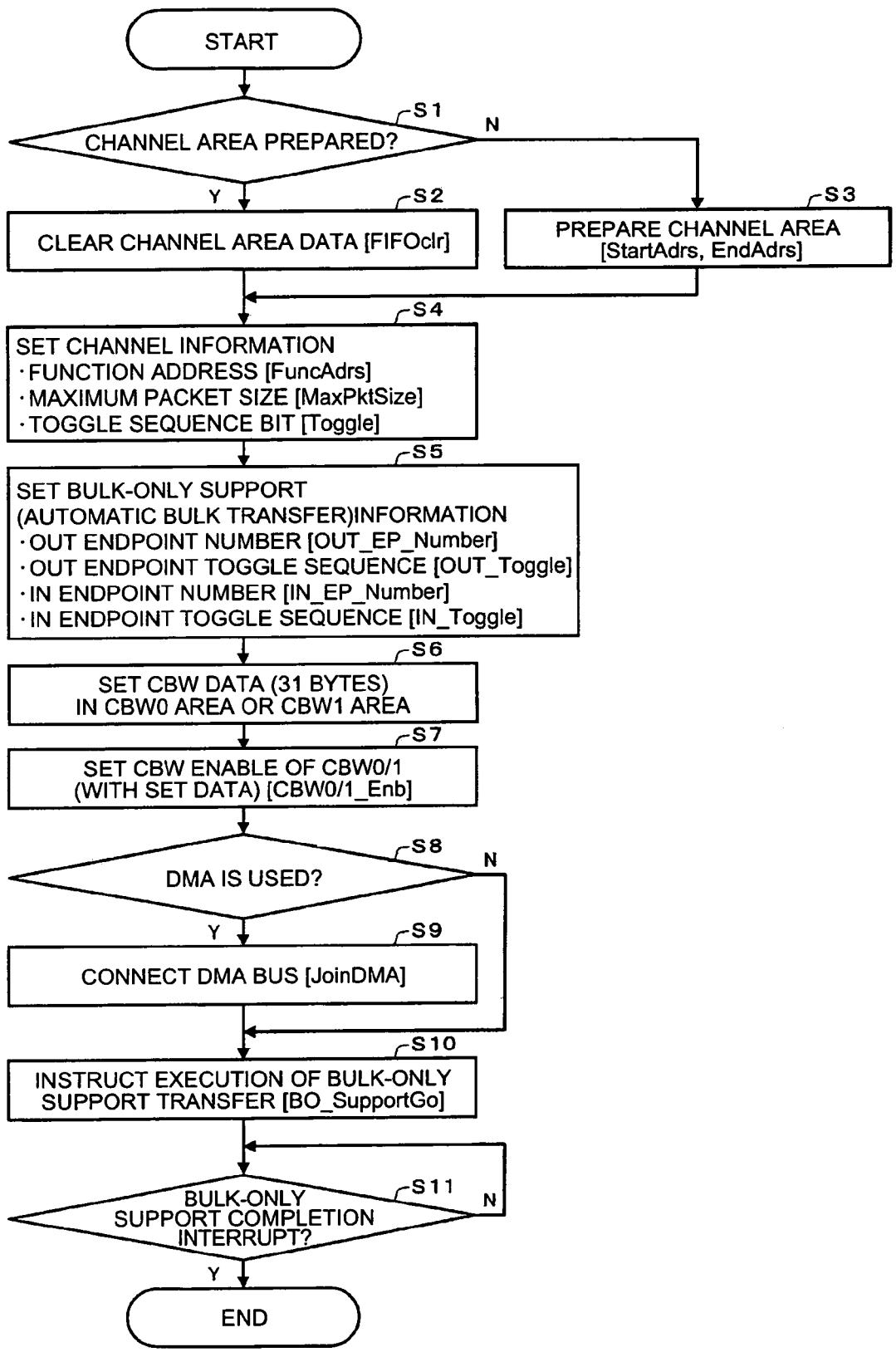
FIG. 11 is a flowchart of a firmware process according to the present embodiment.

Hereinafter, the process and the operation of the present embodiment will be described in detail. FIG. 11 is a flowchart showing an example of the process of the firmware when the bulk-only support function is switched on.

Firstly, the firmware instructs to clear [FIFOClr] the data in the channel area if the channel area has already been prepared, or instructs to prepare [StartAdrs, EndAdrs] the channel area if the channel area has not been prepared yet (steps S1, S2, and S3). Namely, the firmware designates the start address and the end address of each channel area, and instructs to prepare the channel area defined by the start address and the end address.

Then, the firmware sets the channel information (the transfer setting information) in the channel information register 82 (step S4). Namely, the channel information such as the function address [FuncAdrs], which is the address of the USB device, the maximum packet size [MaxPktSize] of the packet transferred via the channel, or the toggle sequence bit [Toggle] is set therein.

Then, the firmware sets the bulk-only support information (the automatic bulk transfer information) (step S5). Namely, the bulk-only support information such as the OUT endpoint number [OUT_EP_Number] for designate the OUT endpoint of the device which is the counter part in the transfer process, the OUT endpoint toggle sequence [OUT_Toggle], the IN endpoint number [IN EP_Number] for designating the IN endpoint of the counter part device, or the IN endpoint toggle sequence [IN_Toggle] is set therein.

Then, the firmware sets the CBW data (31 bytes) in either of the CBW0 or the CBW1 areas (step S6). Namely, the CBW data shown in FIG. 2B is written therein. And then, the firmware sets the CBW enable [CBW0/1_Enb] of either one of the CBW0 and the CBW1 to which the CBW data is set (step S7).

Then, the firmware instructs to connect [JoinDMA] the DMA bus if the DMA transfer is used (steps S8, S9). And, the firmware instructs to execute [B0_SupportGo] the bulk-only support transfer (step S10). And, the firmware waits for the host controller 50 (the data transfer control device) issuing the bulk-only support completion interrupt (step S11).

Figure 12:
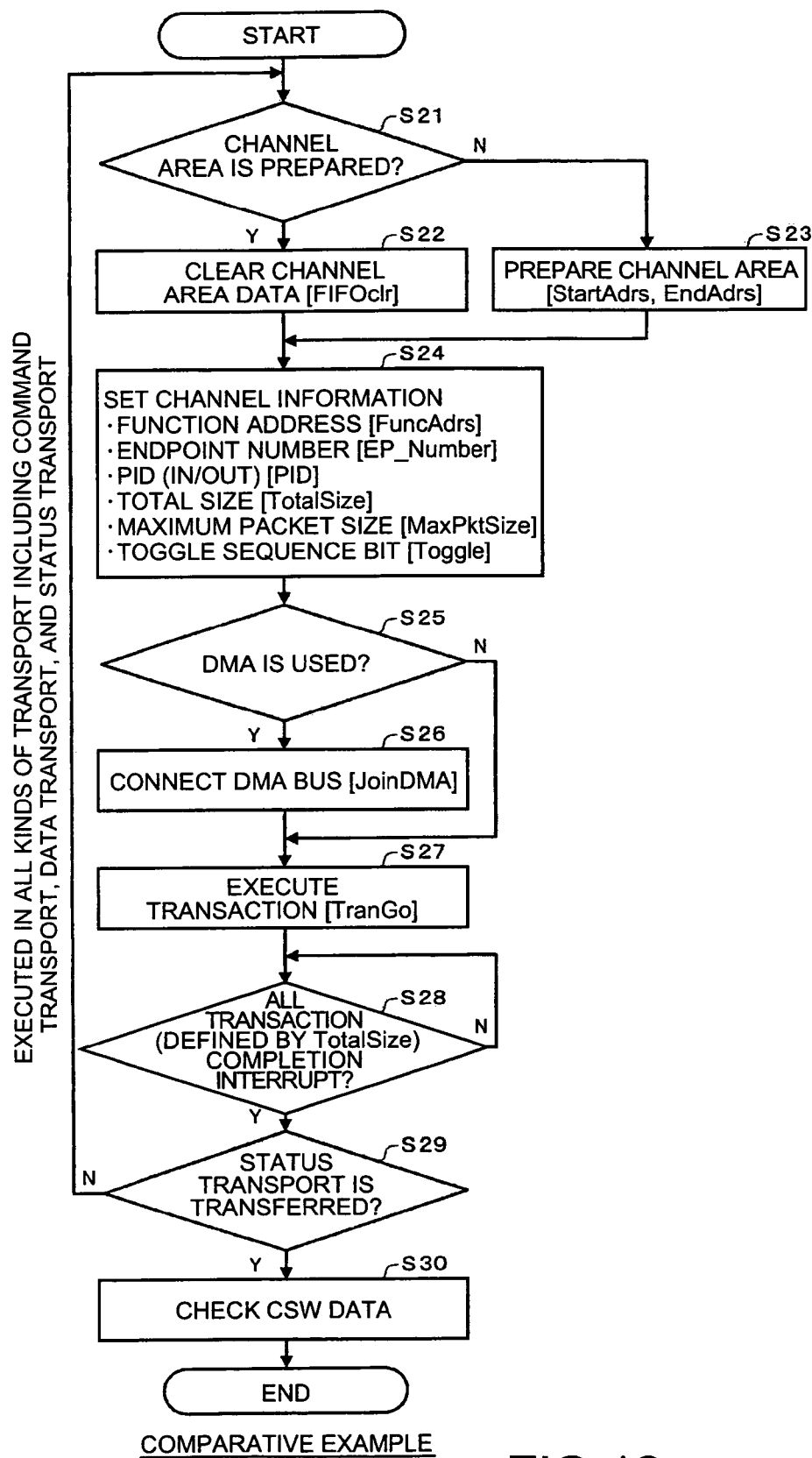
FIG. 12 is a flowchart of a firmware process of a comparative example.

FIG. 12 is a flowchart showing an example of the process of the firmware when the bulk-only support function is switched off.

Firstly, the firmware instructs to clear the data in the channel area if the channel area has already been prepared, or instructs to prepare the channel area if the channel area has not been prepared yet (steps S21, S22, and S23). Subsequently, the firmware sets the channel information such as the function address, the endpoint number, the PID, the total size, the maximum packet size, and the toggle sequence bit (step S24). And, if the DMA transfer is used, the firmware instructs to connect DMA bus, and instructs to execute the transaction (steps S25, S26, and S27). And, the firmware waits for issuance of the interrupt indicating completion of all transactions, and checks the CSW data when the transfer of the status transport is executed (steps S28, S29, and S30).

In the comparative example shown in FIG. 12, since the firmware needs to execute processes of steps S21 through S28 and so on in each transport of the command, the data, and the status, the processing load of the firmware is excessively increased.

On the contrary, according to the present embodiment shown in FIG. 11, the transports of the command, the data, and the status are automatically carried out in sequence when the firmware sets the channel information, the bulk-only support information, and the CBW data (step S4, S5, and S6) to instruct to execute the bulk-only support transfer. And, when the last status transport is completed, the host controller 50 issues a bulk-only support completion interrupt to notify the firmware.

By thus processed, the firmware can be used for other processes in the term from setting the information and instructing to execute issuance of the bulk-only support completion interrupt. Thus, the firmware process and the data transfer process can efficiently be executed.

Note that FIG. 13 shows the registers used in the present embodiment and the functions thereof. The bulk-only support execution register is a register for instructing to execute the bulk-only support transfer (See the step S10 in FIG. 11.). The CBW enable register is a register for indicating that the setting of the CBW area is enabled. The registers of set CBW enable and clear CBW enable are registers for setting or clearing the CBW enable register (See the step S7.). The registers of OUT endpoint toggle sequence and OUT endpoint number are registers for setting an initial value of the toggle sequence of the OUT endpoint and the OUT endpoint number, and the registers of IN endpoint toggle sequence and IN endpoint number are registers for setting an initial value of the toggle sequence of the IN endpoint and the IN end point number (See the step S5.). The bulk-only support execution results register is a register for showing the execution results of the bulk-only support transfer. The registers of transaction status and transaction condition code are registers for showing the transaction results and the detail of the transaction results. The transport status register is a register for indicating the transport in progress or, when a transport is canceled with an error, indicating the transport in which the error occurs.

Figure 14:
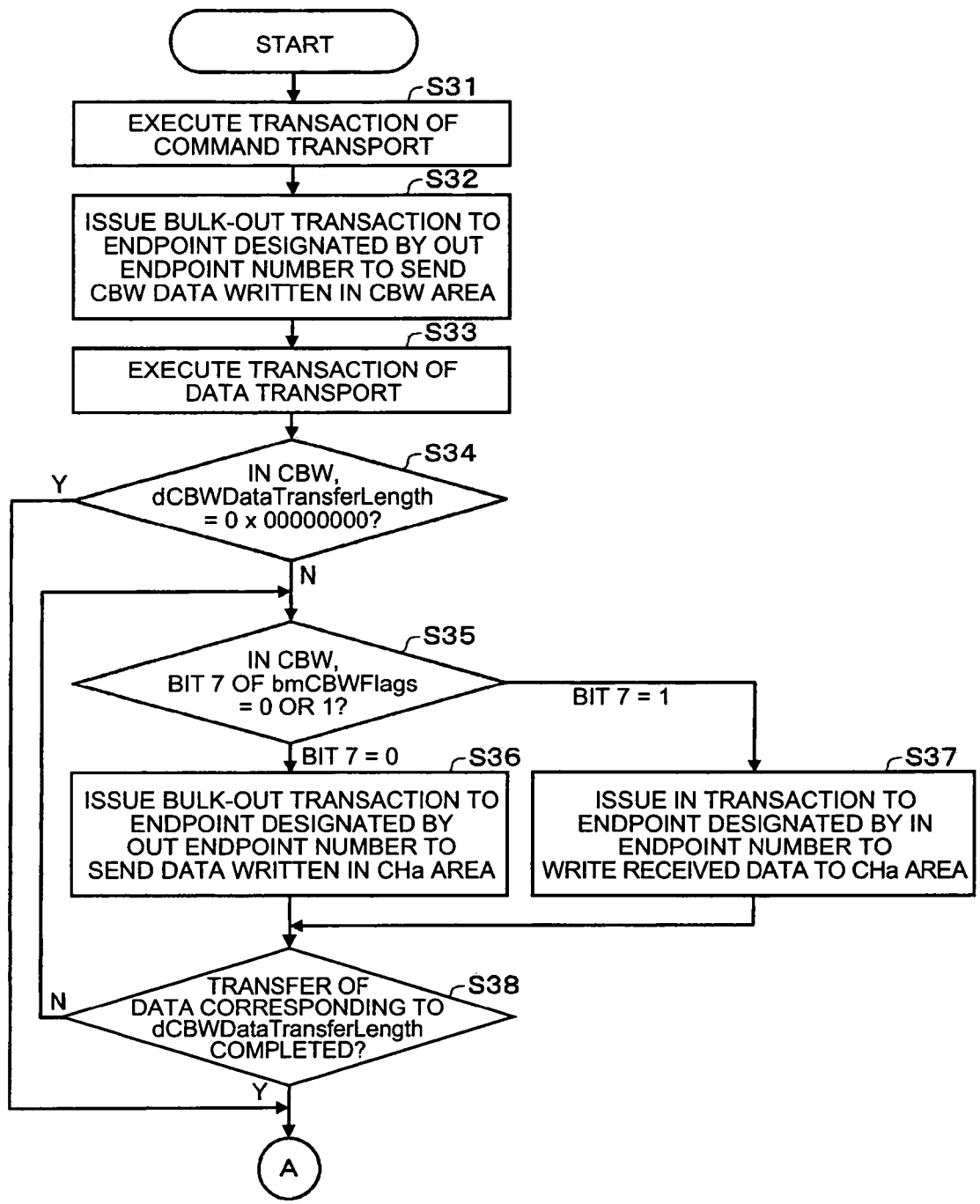
FIG. 14 is a flowchart for explaining a detailed operation on the present embodiment.
Figure 15:
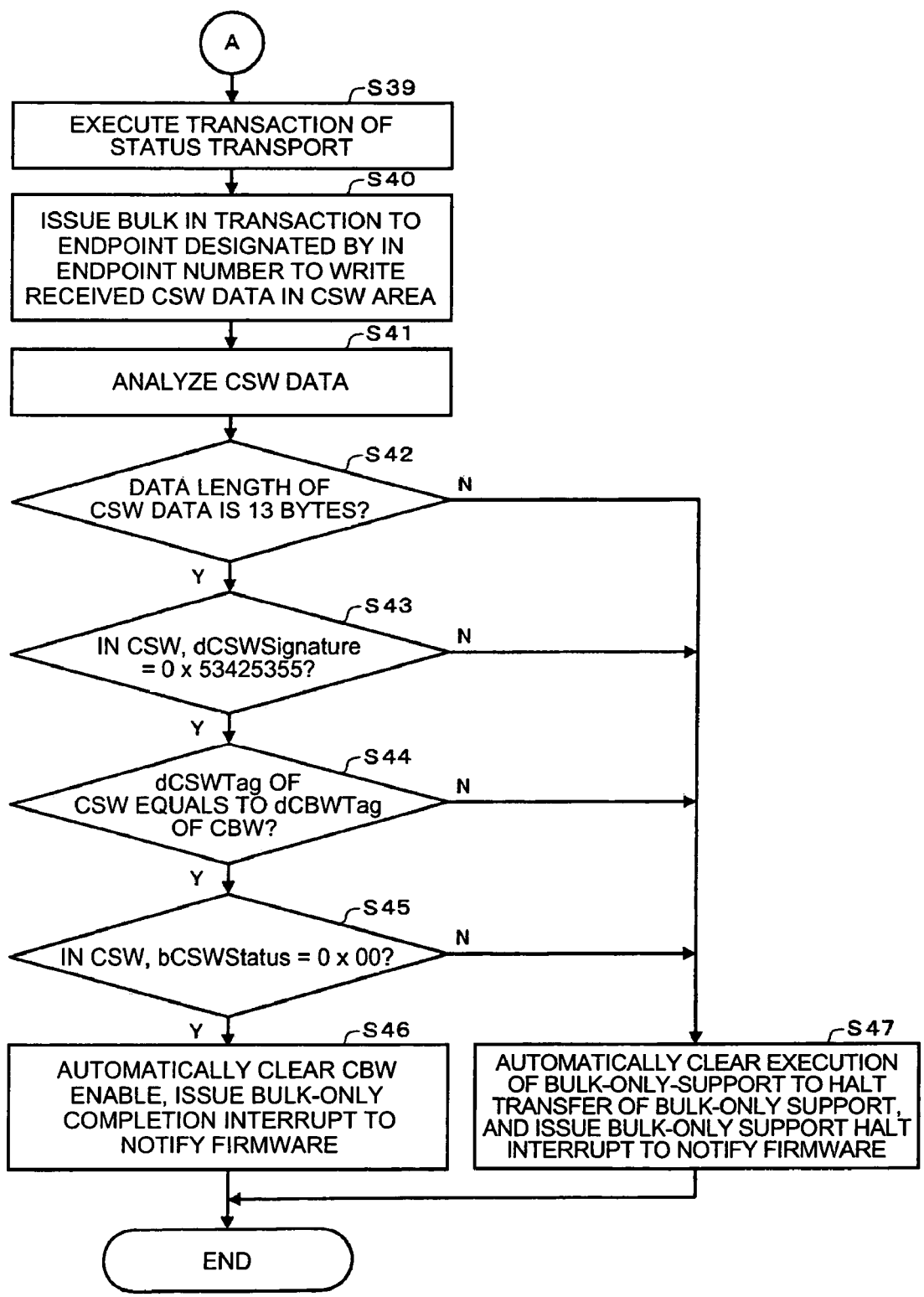
FIG. 15 is a flowchart for explaining a detailed operation on the present embodiment.
Figure 16:
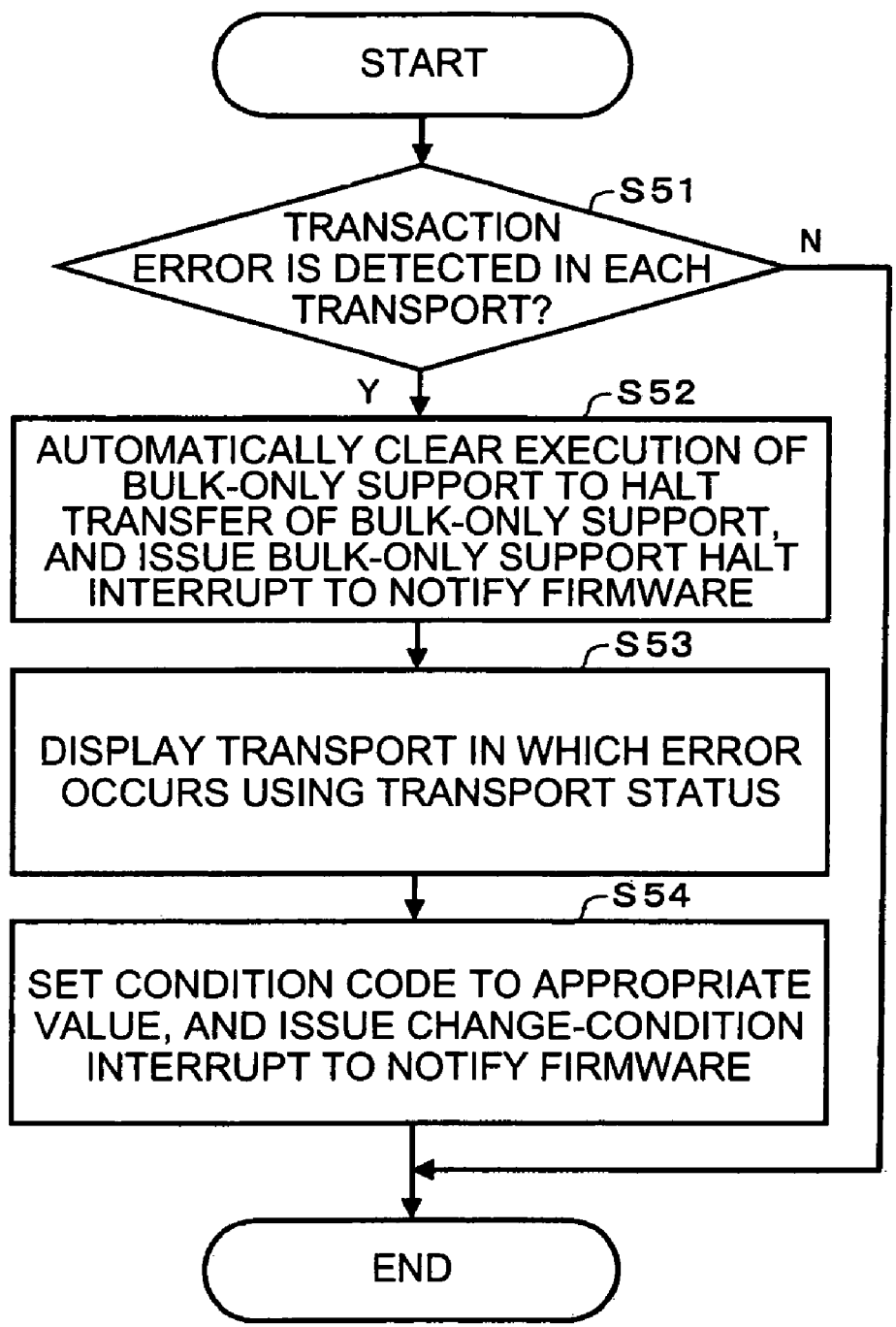
FIG. 16 is a flowchart for explaining a detailed operation on the present embodiment.

FIGS. 14 through 16 show flowcharts for explaining the operation of the present embodiment. As shown in the step S10 of FIG. 11, when the instruction on execution of the bulk-only support transfer is issued by the firmware (the processing section), the host controller 50 executes (issues) the transaction of the command transport (step S31). Specifically, the host controller 50 issues the transaction of the bulk OUT transfer to the endpoint (the bulk OUT endpoint of the device) designated by the OUT endpoint number and sends the CBW data written in the CBW area (step S32). Further specifically, the host controller 50 sends the packet of the OUT token to the endpoint designated by the OUT endpoint number, and then sends the pocket including the CBW data shown in FIG. 2B. And, the host controller 50 waits for receiving the handshake packet of ACK.

When the command transport is completed, the host controller 50 executes the transaction of the data transport (step S33). Specifically, the host controller 50 makes the transition to the step S39 in FIG. 15 if dCBWDataTransferLength in the CBW data is equal to 0x00000000 (step S34). On the contrary, if dCBWDataTransferLength is not equal to 0x00000000, the host controller 50 checks bit 7 of bmCBW-Flags in the CBW data (step S35). And, if the bit 7 of bmCB-WFlags is equal to 0, then the host controller 50 issues the transaction of the bulk OUT transfer to the endpoint designated by the OUT endpoint number to send the sending data written in CHa area (the data area) (step S36). Specifically, the host controller 50 sends the packet of the OUT token to the endpoint designated by the OUT endpoint number, and then sends the pocket including the sending data. And, the host controller 50 waits for receiving the handshake packet of ACK.

In contrast, if the bit 7 of bmCBWFlags is equal to 1, the host controller 50 issues the bulk IN transaction to the endpoint designated by the IN endpoint number to write the received data into the CHa area (step S37). Specifically, the host controller 50 sends the packet of the IN token to the endpoint designated by the IN endpoint number. And, after then, when receiving the packet including the receiving data, the host controller 50 sends the handshake packet of ACK to the device, and at the same time writes the receiving data into the CHa area.

Subsequently, the host controller 50 judges whether or not the data transfer corresponding to dCBWDataTransferLength is completed (step S38), and go back to the step S35 if not completed. On the contrary, if the transfer is completed, the host controller 50 decides that the data transport is completed, and executes the transaction of the status transport (step S39 in FIG. 15). Specifically, the host controller 50 issues the bulk IN transaction to the endpoint designated by the IN endpoint number to write the received CSW data into the CSW area (step S40). Further specifically, the host controller 50 sends the packet of the IN token to the endpoint designated by the IN endpoint number. And, after then, when receiving the packet including the CSW data, the host controller 50 sends the handshake packet of ACK to the device, and at the same time writes the CSW data into the CSW area.

Subsequently, the host controller 50 (an analyzing circuit 52) analyzes the CSW data to detect an error in the CSW data (step S41). Specifically, the host controller checks whether or not the data length of the CSW data is 13 bytes, whether or not dCSWSignature in the CSW is equal to 0x53425355, whether or not the dCSWTag in CSW is equal to dCBWTag in CBW, and whether or not bCSWStatus is equal to 0x00(steps S42 through S45).

And, if no error is detected throughout the steps S42 through S45, the host controller 50 automatically clears the CBW enable and issues the bulk-only support completion interrupt to inform the firmware (step S46).

On the contrary, if an error is detected in either of the steps S42 through S45, the host controller 50 automatically clears the bulk-only support execution (the corresponding bit of the register) to stop the bulk-only support transfer, and issues a bulk-only support halt interrupt to notify the firmware (step S47).

Note that, in the present embodiment, if a transaction error is detected in each transport (step S51 in FIG. 16), the host controller 50 automatically clears execution of the bulk-only support to stop the bulk-only support transfer, and issues the bulk-only support halt interrupt to notify the firmware (step S52). Further, the host controller 50 displays the transport in which the error occurs using the transport status register (step S53). Further, the host controller 50 sets the condition code register to an appropriate value, and issues a change condition interrupt to notify the firmware (step S54).

As described above, in the present embodiment, the host controller 50 controls (manages or executes) the transaction of the data transport based on the CBW data written in the CBW (the command block) area.

Figure 17:
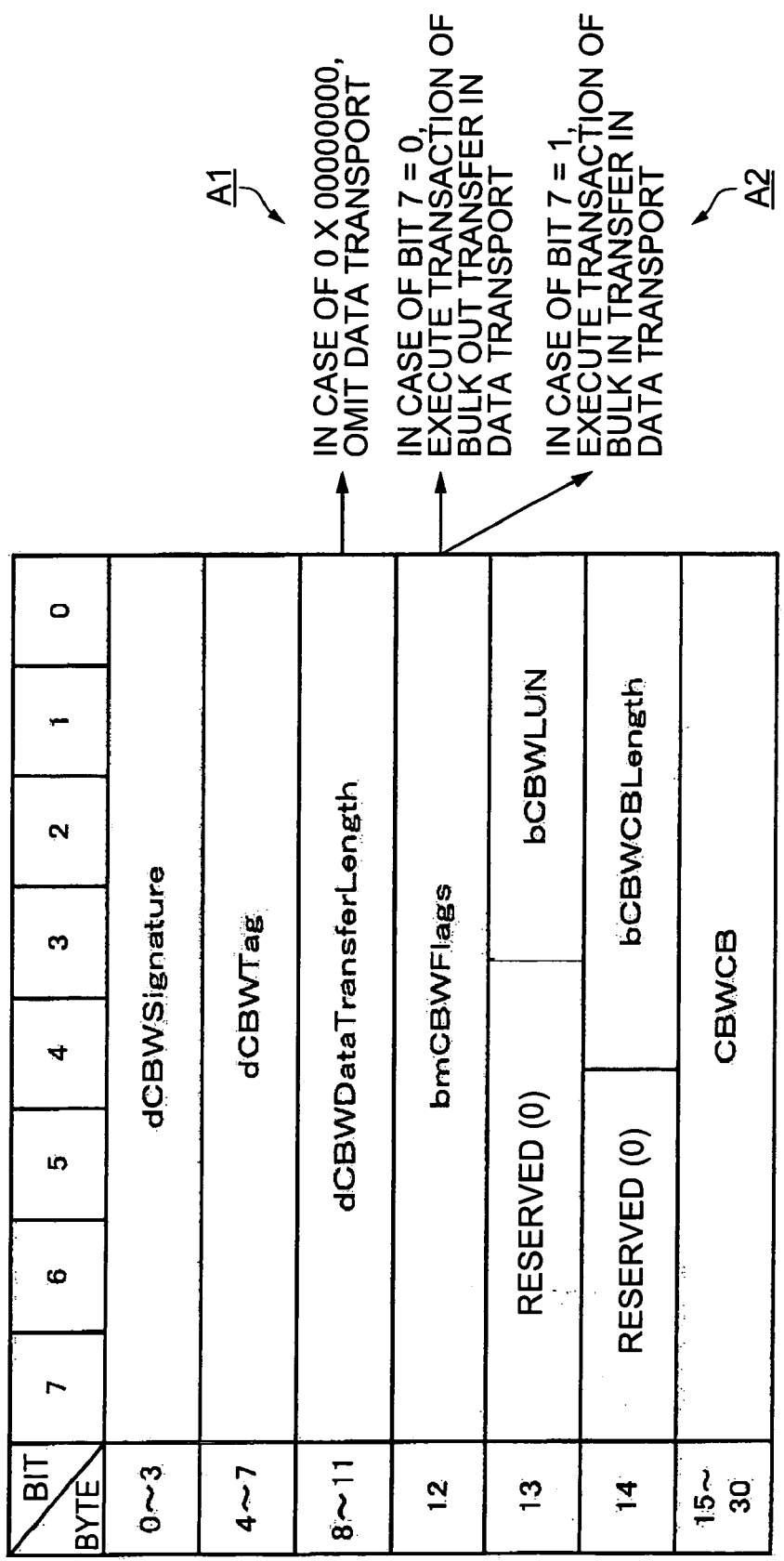
FIG. 17 is a diagram for explaining a control method of the data transport based on CBW data.

Namely, as shown in the step S34 and a comment A1 in FIG. 17, if the data transfer length dCBWDataTransferLength of the CBW is equal to 0, the host controller 50 executes the transaction of the status transport without executing the transaction of the data transport.

Further, as shown in the steps of S36 and S37, and a comment A2 in FIG. 17, the host controller 50 decides which transaction is executed, the transaction of the bulk OUT transfer or the transaction of the bulk IN transfer, based on bit 7 of bmCBWFlags in the CBW data.

For example, in a comparative example shown in FIG. 10, the transaction control of the data transport is executed based on the information, which is set prior to execution of the data transport. Namely, after execution of the command transport, and before execution of the data transport, information regarding presence or absence of the data transport or the transfer direction (OUT or IN) in the data transport need to be set. Therefore, the processing load of the firmware increases.

In contrast, in the present embodiment, the attention is focused on that the information regarding presence or absence of the data transport and the transfer direction (OUT, IN) in the data transport can be found out by analyzing the CBW data. Namely, according to analysis of the CBW data, it is automatically judged that the data transport is absent if dCBWDataTransferLength is 0, or it is automatically judged that the data transport is present if dCBWDataTransferLength is other than 0. Further, it is automatically judged that the transfer direction of the data transport is an OUT direction (bulk OUT) if the bit 7 of bmCBWFlags in the CBW data is 0, or it is automatically judged that the transfer direction of the data transport is an IN direction (bulk IN) if the bit 7 of bmCBWFlags is 1.

By thus processed, since the transaction in the data transport is controlled in accordance with the CBW data which is set prior to execution of the command transport, the processing load of the firmware can be reduced. Further, since the firmware does not need to individually set the information for controlling the data transport, the processing load of the firmware can further be reduced. Namely, the firmware does not need to set the information regarding presence or absence of the data transport or the transfer direction in the step S5 in FIG. 11. And, when the firmware sets the CBW data in the step S6 in FIG. 11, the hardware (the host controller) automatically judges the information regarding presence or absence of the data transport and the transfer direction based on the set CBW data, thus the processing load of the firmware can be reduced.

Further, in the present embodiment, as shown in the step S4 in FIG. 11, the maximum packet size, the function address of the device, and so on are set to the channel information register 82 as the channel information. Further, as shown in the step S5 in FIG. 11, the OUT endpoint number for designating the endpoint of the bulk OUT transfer, the IN endpoint number for designating the endpoint of the bulk IN transfer, and so on are set to the bulk-only support information register 84 as the bulk-only support information.

And, in the present embodiment, the bulk-only transport (the automatic bulk transfer) is executed in accordance with the channel information set in the channel information register 82 in the step S4 in FIG. 11. Namely, the bulk IN transfer, the bulk OUT transfer, and so on are executed with the device designated by the function address in the channel information. Further, the control transfer or the like is also executed with the device designated by the function address. And, it becomes that, in the data transfer processes, the data is transferred while divided into a number of packets in accordance with the maximum packet size included in the channel information.

Further, in the present embodiment, as shown in the step S36 in FIG. 14, when the transaction of the bulk OUT transfer is executed in the data transport, the packet including the sending data is automatically sent to the endpoint designated by the OUT endpoint number which is set in the step S5 in FIG. 11. Specifically, the device is designated by the function address in the channel information, and the endpoint of the device is designated by the OUT endpoint number in the bulk-only transport information. And then, the OUT token is issued to the designated endpoint, and the data packet is sent to the endpoint.

Further, in the present embodiment, as shown in the step S37 in FIG. 14, when the transaction of the bulk IN transfer is executed in the data transport, the packet including the receiving data is automatically received from the endpoint designated by the IN endpoint number set thereto. Specifically, the device is designated by the function address in the channel information, and the endpoint of the device is designated by the IN endpoint number in the bulk-only transport information. And then, the IN token is issued to the designated endpoint, and the data packet is received from the endpoint.

By thus executing the bulk-only transport with setting the channel information and the bulk-only support information, efficient data transfer can be realized while suppressing the processing load of the firmware to the minimum. Namely, since the information (the function address, the maximum packet size) necessary for the channel transfer can commonly be set as the channel information, and the information (the OUT endpoint number, the IN endpoint number) can individually be set as the bulk-only support information, the processes can be made more efficient. Further, it can easily deal with the case in which a number of storage devices are connected to the data transfer control device in FIG. 7, or the case in which the on/off switching function of the bulk-only support is realized.

Figure 18:
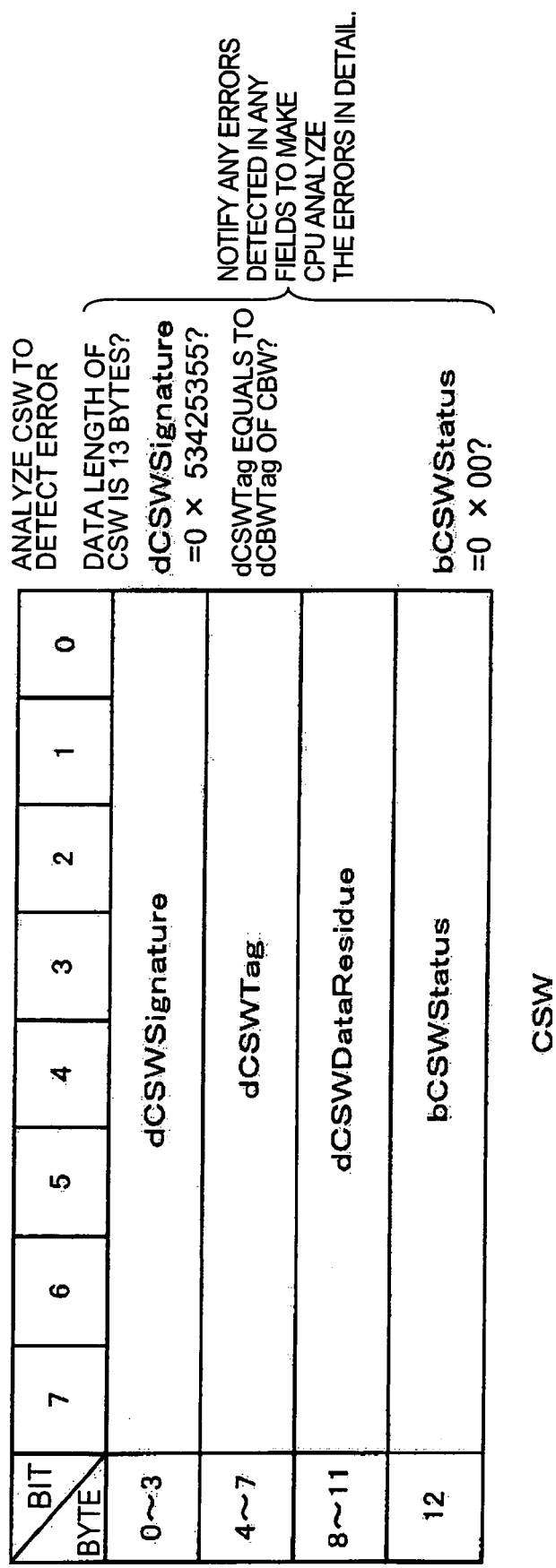
FIG. 18 is a diagram for explaining an error detection method with CSW.

Further, in the present embodiment, as shown in the step S41 in FIG. 15, the CSW data received in the status transport is automatically analyzed by the H/W of the analyzing circuit 52 (the host controller 50). And, if an error is detected in either of the plural fields (dCSWSignature, dCSWTag, bCSWStatus) on the CSW data as shown in the steps S42 through S45 in FIG. 15 and in FIG. 18, the error in the CSW data is notified to the firmware (the processing section) using an interrupt or the like as shown in the step S47 in FIG. 15. The firmware thus notified then analyzes the CSW data written in the CSW area in further detail.

Since there are a number of levels of errors in the errors of the CSW data, if analysis of the all levels of errors is charged to the firmware (F/W), the processing load of the firmware becomes heavy. In this point, in the present embodiment, since the low levels of errors shown in the steps S42 through S45 in FIG. 15 are analyzed by the analyzing circuit 52, which is H/W, instead of the firmware, the processing load of the firmware can be reduced. Further, since the analysis of the low levels of errors shown in steps S42 through S45 can be carried out by the analyzing circuit 52 including a data matching detection circuit or a comparator circuit, increase in the circuit scale can be suppressed to the minimum.

In contrast, if the analyzing circuit 52 is arranged to analyze the high level errors different from the low level errors shown in the steps S42 through S45 in FIG. 15, the circuit scale is considerably enlarged. In the bulk-only transport, as shown in FIG. 2A, the CBW of the command transport and the bulk OUT data are transferred using a common endpoint (EP1). Further, the CSW of the status transport and the bulk IN data of the data transport are also transferred using a common endpoint. Therefore, the phases of the transports of the command, the data, and the status in the host side can be shifted from those of the device side, and accordingly, a reset recovery process is necessary for eliminating the phase shift. The high level error detection and restoring process for such a reset recovery process is complicated, and therefore, is not suitable for analysis by the analyzing circuit 52 which is H/W.

According to the present embodiment, only the low level errors are detected by the analyzing circuit 52, and if such an error is detected, the detection of the error is notified to the firmware as shown in the step S47 in FIG. 15. And, the firmware notified with the error reads out the CSW data from the CSW area using the RAM monitoring function or the like to analyze it in detail, thus it becomes possible to perform the process such as the reset recovery process. Thus, an appropriate error detection and restoring process can be carried out while keeping an increase in the processing load of the firmware or increase in the circuit scale of the analyzing circuit 52 to the minimum.

Further, in the present embodiment, as shown in the steps S51 through S54 in FIG. 16, if the transaction error is detected in each of the command, the data, and the status transports, execution of the bulk-support transfer is stopped, and the transport (the transaction) in which the error occurs is notified to the firmware. By thus processed, the firmware can easily recognize which one of a series of transports, the command, the data, and the status forming the bulk-only transport causes the transaction error. Thus, the processing load of the firmware when the transaction error occurs can be reduced.

Further, in the present embodiment, as shown in FIG. 5, the CBW0 area and the CBW1 area (the first and the second command block areas) are prepared in the data buffer 100 as the CBW area. Namely, two kinds of CBW areas are prepared. And, while the firmware is writing the CBW data in either one of the CBW0 and CBW1 areas, the bulk-only support transfer shown in FIG. 9 is executed based on the CBW data written in the other of the areas. Namely, in FIG. 19A, while the firmware is writing the CBW data in the CBW0 area, the bulk-only support transfer is executed based on the CBW data in the CBW1 area. Further, in FIG. 19B, while the firmware is writing the CBW data in the CBW1 area, the bulk-only support transfer is executed based on the CBW data in the CBW0 area. Note that, as shown in the steps S6 and S7, the firmware sets the CBW enable corresponding to the CBW area in which the CBW data is written, and instructs the host controller 50 to execute the bulk-only support transfer with respect to that CBW area.

Figure 19A:
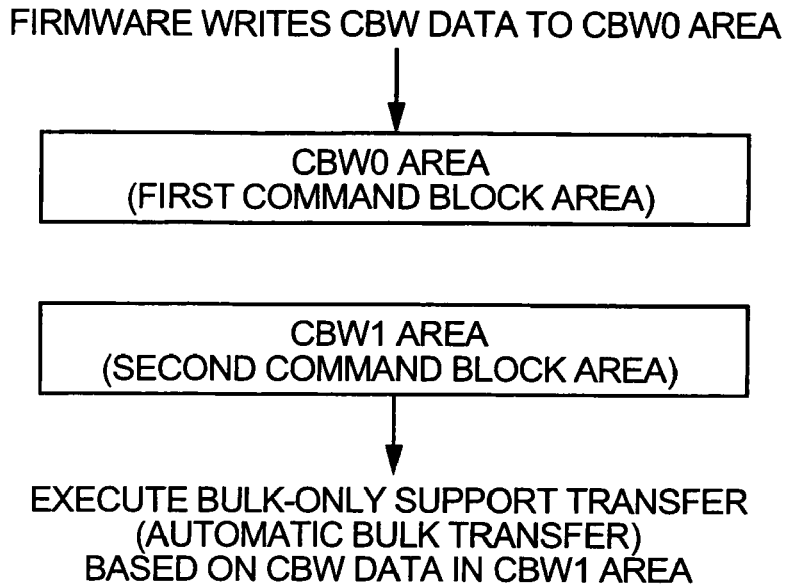
FIGS. 19A and 19B are charts for explaining a method of using CBW0 area and CBW1 area.
Figure 19B:
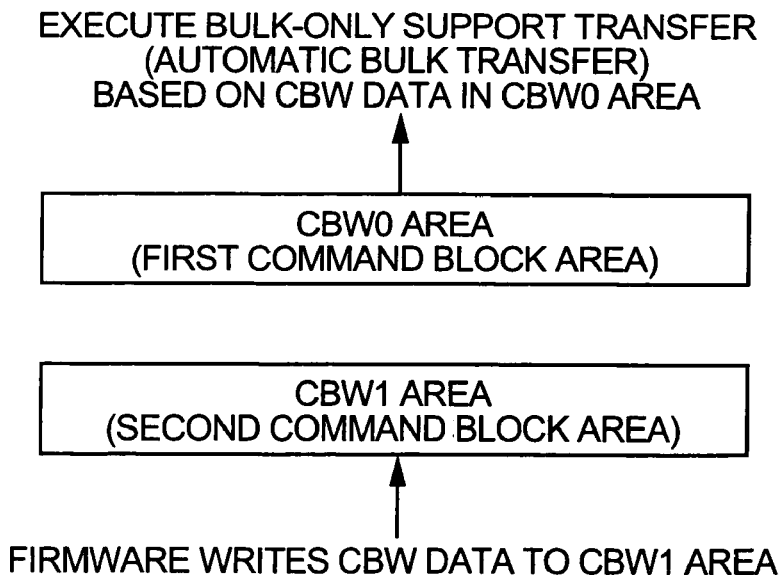

According to the method of the present embodiment, since the bulk-only support transfer of the CBW data in the CBW1 area can be executed while the firmware is preparing the CBW data in the CBW0 area, for example, in FIG. 19A, the data transfer can be made more efficient. Further, since the firmware can prepare and write the CBW data in the CBW0 area at a desired timing without waiting for completion of the bulk-only support transfer in the CBW1 area, the firmware process can also be made efficient.

7. Detailed Configuration Example

Figure 20:
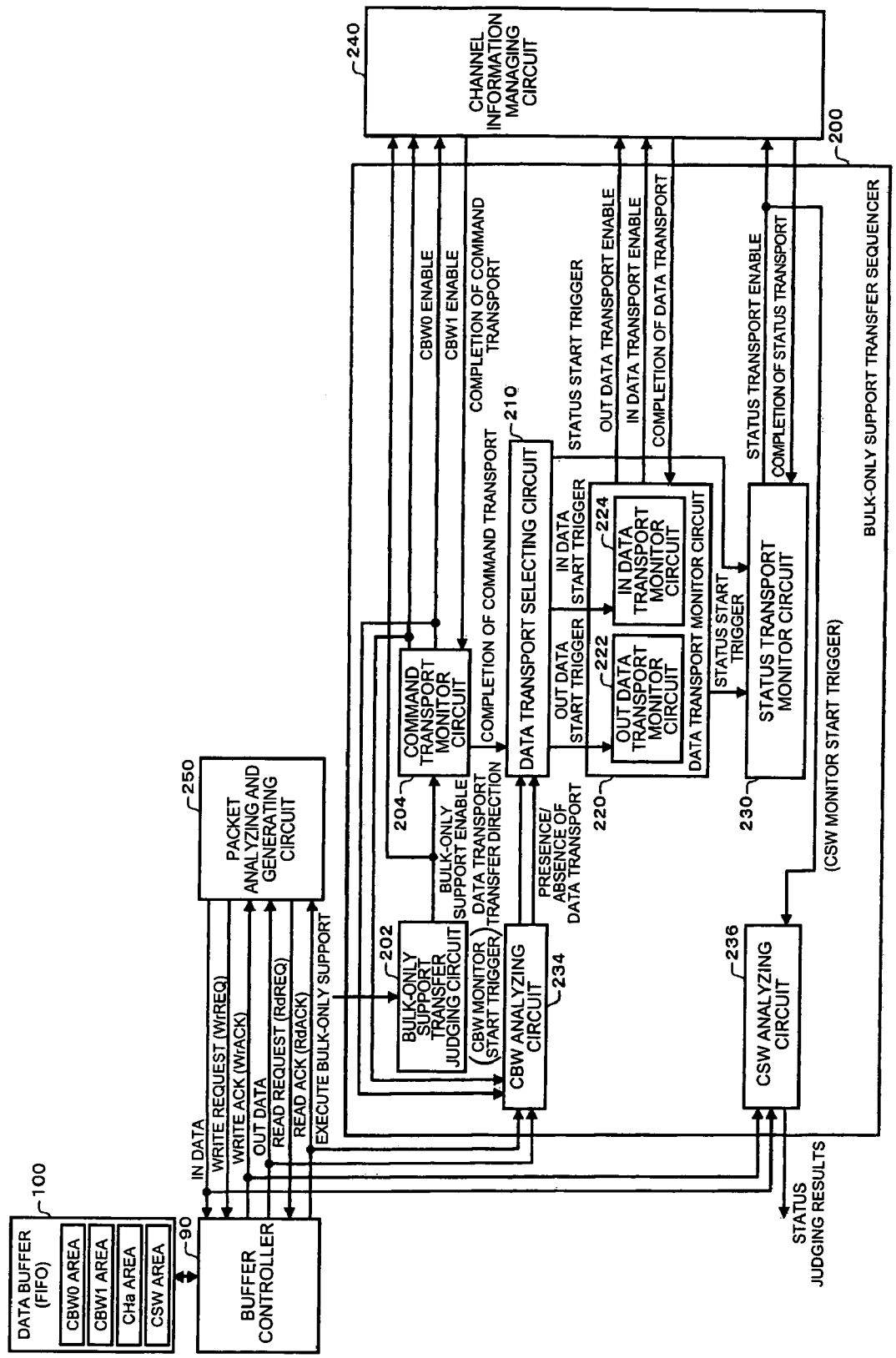
FIG. 20 is a detailed block diagram of a circuit example that realizes bulk-only support transfer.

FIG. 20 shows a detailed example of a circuit for carrying out the bulk-only support transfer. A channel information managing circuit 240 is a circuit for managing the information regarding the target channel. The channel information managing circuit 240, when the channel to be the target of execution of transfer is designated, performs a process of selecting the corresponding channel information to pass the information to a transaction managing circuit not shown in the drawings.

A packet analyzing and generating circuit (a packet handler circuit) 250 analyzes IN data included in a receiving packet and generates a sending packet including OUT data. And in the case of the bulk IN transfer, the packet analyzing and generating circuit 250 outputs the IN data included in the receiving packet to a buffer controller 90, and at the same time outputs a write request. And, if the IN data is the receiving data of the data transport, the buffer controller 90 writes the IN data to the CHa area (the data area) in the data buffer 100. On the contrary, if the IN data is the CSW data of the status transport, the buffer controller 90 writes the IN data, which is the CSW data, to the CSW area in the data buffer 100. And then, the buffer controller 90 outputs a write ACK (acknowledgement) to the packet analyzing and generating circuit 250.

In contrast, in the case of the bulk OUT transfer, the buffer controller 90 outputs the OUT data, which is read out from the data buffer 100, to the packet analyzing and generating circuit 250. And, if the OUT data is the sending data of the data transport, the buffer controller 90 reads out the OUT data from the CHa area to output to the packet analyzing and generating circuit 250, and at the same time outputs a read ACK. In contrast, if the OUT data is the CBW data of the command transport, the buffer controller 90 reads out the OUT data, which is the CBW data, from the CBW0 area or the CBW1 area to output to the packet analyzing and generating circuit 250, and at the same time outputs a read ACK.

A bulk-only support transfer sequencer 200 is a circuit for managing the sequence of the bulk-only support transfer. The bulk-only support transfer sequencer 200 includes a bulk-only support transfer judging circuit 202, a command transport monitor circuit 204, a data transport selecting circuit 210, a data transport monitor circuit 220, a status transport monitor circuit 230, a CBW analyzing circuit 234, and a CSW analyzing circuit 236. Note that the bulk-only support transfer sequencer 200 does not need to include all these circuit blocks, but can omits a part of these circuit blocks.

The bulk-only support transfer judging circuit 202, in response to the bulk-only support execution signal, judges whether or not the bulk-only support transfer is carried out. And, if the bulk-only support execution signal becomes active, the bulk-only support transfer judging circuit decides that the bulk-only support transfer is carried out, and makes the bulk-only support enable signal active. Thus, the instruction on commencement of the bulk-only support transfer is made.

The command transport monitor circuit 204 is a circuit for instructing to commence the transaction of the bulk OUT transfer in the command transport in response to the instruction on commencement of the bulk-only support transfer. Namely, the command transport monitor circuit 204, when the bulk-only support enable signal becomes active, instructs to commence the transaction of the command transport by making the CBW0 enable signal or the CBW1 enable signal active. And, when the command transport is completed, the command transport monitor circuit 204 makes the command transport completion signal active.

The data transport selecting circuit 210 is a circuit for selecting either one of execution of the transaction of the bulk OUT transfer in the data transport, execution of the transaction of the bulk IN transfer in the data transport, or no execution of the data transport based on the information regarding both of the transfer direction of the data transport and presence or absence of the data transport when the transaction of the bulk OUT transfer in the data transport is completed (when the command transport completion signal becomes active).

In other wards, the data transport selecting circuit 210 selects the execution of the transaction of the bulk OUT transfer by making an OUT data start trigger active if the transfer direction is "OUT" and "the data transport is present." Or, the data transport selecting circuit 210 selects the execution of the transaction of the bulk IN transfer by making an IN data start trigger active if the transfer direction is "IN" and "the data transport is present." In contrast, if "the data transport is absent," the data transport selecting circuit 210 makes the status start trigger active to commence execution of the command transport bypassing the data transport. In this case, whether the transfer direction is "IN" or "OUT" is determined based on a data transport transfer direction signal from the CBW analyzing circuit 234. Further, whether the data transport is present or absent is determined based on a data transfer presence/absence signal from the CBW analyzing circuit 234.

The data transport monitor circuit 220 is a circuit for instructing to commence the transaction of the bulk OUT transfer in response to selection of executing the transaction of the bulk OUT transfer in the data transport, and for instructing to commence the transaction of the bulk IN transfer in response to selection of executing the transaction of the bulk IN transfer in the data transport. The data transport monitor circuit 220 includes an OUT data transport monitor circuit 222 and an IN data transport monitor circuit 224.

Here, the OUT data transport monitor circuit 222 makes the OUT data transport enable signal active to instruct the channel information managing circuit 240 to commence the transaction of the bulk OUT transfer when the OUT data start trigger becomes active. And, when the data transport is completed, the OUT data transport monitor circuit 222 makes the status start trigger active.

Further, the IN data transport monitor circuit 224 makes the IN data transport enable signal active to instruct the channel information managing circuit 240 to commence the transaction of the bulk IN transfer when the IN data start trigger becomes active. And, when the data transport is completed, the IN data transport monitor circuit 224 makes the status start trigger active.

The status transport monitor circuit 230 is a circuit for instructing to commence the transaction of the bulk IN transfer in the command transport when the transaction of the bulk OUT transfer or the transaction of the bulk IN transfer in the data transport is completed. Specifically, when the status trigger becomes active, the status transport monitor circuit 230 makes the status transport enable signal active to instruct the channel information managing circuit 240 to commence the transaction of the status transport.

The CBW analyzing circuit 234 performs analysis (decode) of the CBW data written in the CBW0 area or the CBW1 area. Specifically, the CBW analyzing circuit 234 receives the OUT data from the buffer controller 90. And, if the CBW0 enable signal from the command transport monitor circuit 204 is active, the CBW analyzing circuit 234 analyzes the OUT data read out from the CBW0 area of the data buffer 100 as the CBW data. In contrast, if the CBW1 enable signal is active, the CBW analyzing circuit 234 analyzes the OUT data read out from the CBW1 area as the CBW data. And, as described with reference to FIG. 17, the CBW analyzing circuit 234 judges the transfer direction of the data transport and whether the data transport is present or absent based on the analysis result of the CBW data, and outputs the data transport transfer direction signal and the data transport presence/absence signal to the data transport selecting circuit 210.

The CSW analyzing circuit 236 performs analysis (decode) of the CSW data received in the status transport. Specifically, the CSW analyzing circuit 236 receives the CSW data, which is IN data, from the packet analyzing and generating circuit 250. And, the CSW analyzing circuit 236 analyzes the CSW data when the status transport enable signal (a CSW monitor start trigger) from the status transport monitor circuit 230 becomes active. And, the CSW analyzing circuit 236 performs the error detection process of the CSW data as described with reference to FIG. 18, and in response to detection of an error, makes the status judgment result signal active, and issues an interrupt or the like to the firmware.

By adopting the circuit configuration shown in FIG. 20, a series of transports of the command, the data, and the status can automatically be executed without any help of the firmware.

8. Configuration of Electronic Instrument

Figure 21A:
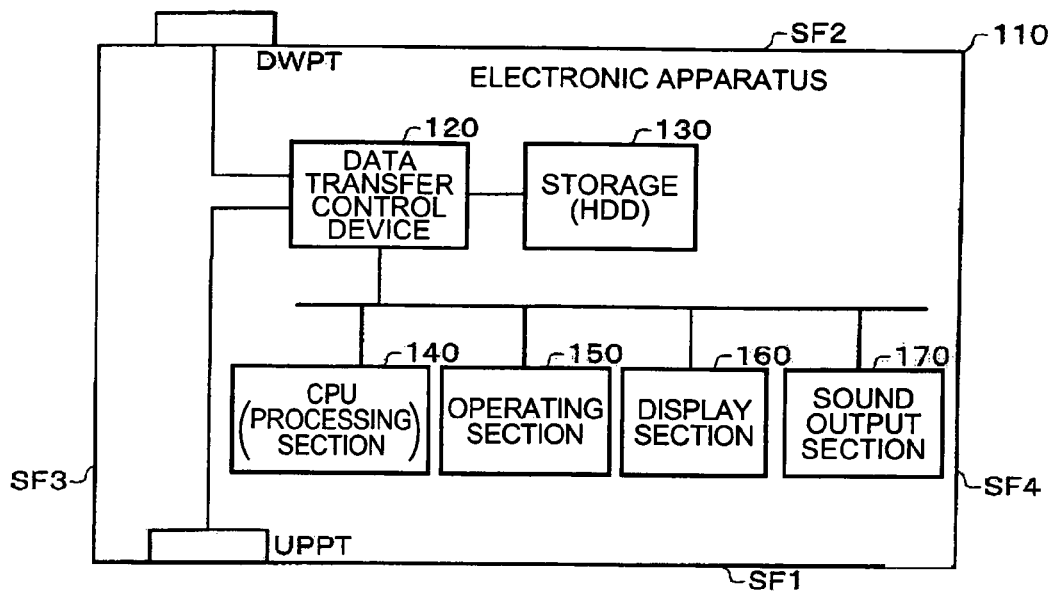
FIGS. 21A and 21B are diagrams of a configuration example of an electronic instrument according to the present embodiment.
Figure 21B:
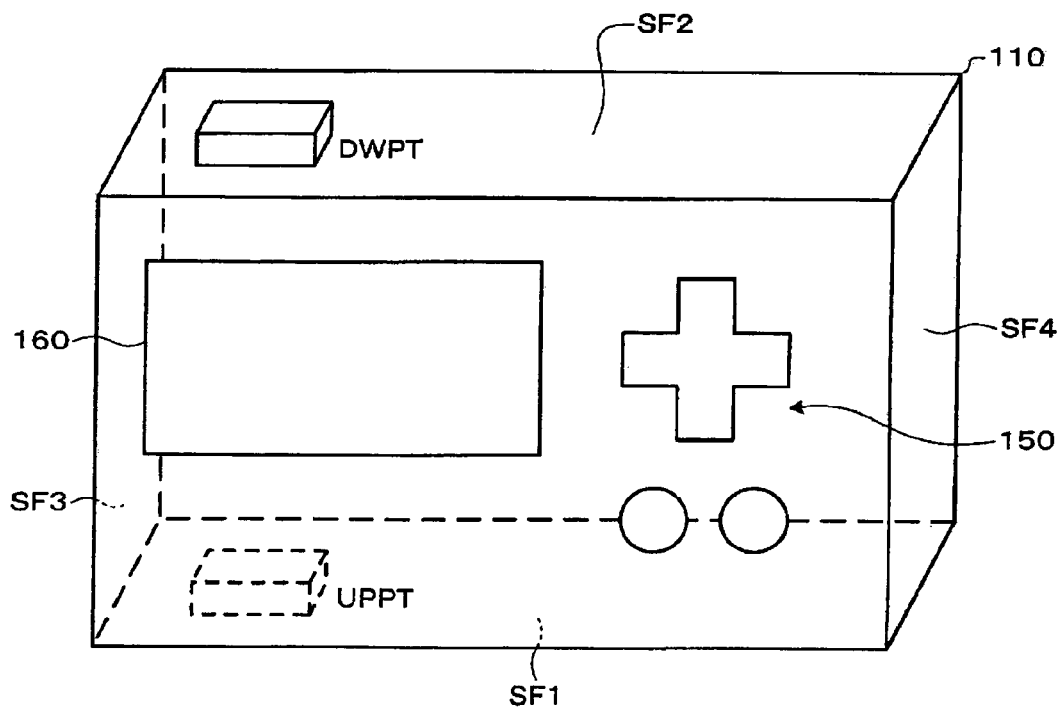

FIGS. 21A and 21B show a configuration example of an electronic instrument including the data transfer control device according to the present embodiment. The electronic instrument 110 includes the data transfer control device 120 described with reference to FIGS. 2A through 2C and so on, a storage device 130, a CPU 140 (a processing section), a operating section 150, a display section 160, and a sound output section 170. Further, the electronic instrument 110 also includes an upstream port UPPT and a downstream port DWPT. Note that a configuration without a part of these elements can also be adopted.

In FIGS. 21A and 21B, the upstream port UPPT is provided on a side surface SF1 (a first surface, a first side) of the electronic instrument 110. Meanwhile, the downstream port DWPT is provided on a side surface SF2 (a second surface, a second side) of the electronic instrument 110. Here, the side surface SF2 is an opposite face (a facing surface) of the side surface SF1. Further specifically, the downstream port DWPT is disposed at a position (a position on the side surface SF2) corresponding to a position (a position on the side surface SF1) where the upstream port UPPT is disposed. Still further specifically, the UPPT and the DWPT are disposed at axisymmetric positions with respect to the centerline of a line (the centerline of the SF1) extending along the side surface SF1 in the longitudinal direction and a line (the centerline of the SF2) extending along the side surface SF2 in the longitudinal direction.

The data transfer control device 120 is connected to the upstream port UPPT and the downstream port DWPT, and controls the data transfer (the data transfer in the upstream direction) via the UPPT and the data transfer (the data transfer in the downstream direction) via the DWPT. Specifically, the data transfer control device 120 controls the data transfer via the UPPT in the device mode, and controls the data transfer via the DWPT in the host mode.

The storage device 130 is for storing sound data (music data, audio data) or image data (still image data, movie data). As the storage device 130, a hard disc drive (HDD), a large capacity memory (RAM), an optical disc drive, and so on can be used.

The CPU 140 is for performing overall control of the electronic instrument 110 and so on. The operating section 150 is for the user to operate the electronic instrument 110. The display section 160 (a liquid crystal display, an organic EL display) is for displaying various images (still images, moving images) to the user. The sound output section 170 (a speaker, a headphone terminal) is for outputting sound such as music or audio.

If, for example, the electronic instrument 110 is a portable music player (an audio instrument), music data is downloaded to and stored in the storage device 130 from an external electronic instrument (a PC or the like) via the UPPT or the DWPT. And, the music data thus stored is read out from the storage device 130 to be replayed, and output to the user from the sound output section 170. Further, if the electronic instrument 110 is a portable movie player, movie data is downloaded to and stored in the storage device 130 from an external electronic instrument via the UPPT or the DWPT. And, the movie data thus stored is read out from the storage device 130, and displayed to the user using the display section 160.

Note that the present invention is not limited to the present embodiment, but can be put into practice with various modification within the scope or the spirit of the present invention. For example, the terms (CBW, CSW, USB, host controller, balk-only support transfer, etc) for which broad terms or synonymous terms (command block, status block, bus or serial bus, transfer controller, bulk-only support transfer, etc) are cited in some descriptions of the specification or the drawings can be replaced with such broad terms or synonymous terms in other descriptions of the specification and the drawings.

Further, the configurations of the data transfer control device and the electronic instrument according to the invention is not limited to the configuration shown in FIGS. 2A through 2C, 20, 21A, and 21B and so on, but a part of the composing elements can be omitted, or the connections therebetween can be modified.

Further, the invention can also be applied to various electronic instruments (e.g., a portable music player, a portable movie player, a cellular phone, a portable information terminal, a personal digital assistance, an electronic dictionary, an electronic organizer).

Further, although in the present embodiment the case in which the invention is applied to the data transfer compliant to the bulk-only transport standard of USB is explained, the invention can also be applied to the data transfer compliant to a standard based on the same technical concept or a standard developed from this standard.

The entire disclosure of Japanese Patent Application No. 2005-29225, filed Feb. 4, 2005 is expressly incorporated by reference herein.

What is claimed is:

1. A data transfer control device that transfers data via a bus, comprising:

a buffer controller that controls access to a data buffer, the data buffer including a command block area, a data area and a status block area;

a transfer controller that controls data transfer;

a first circuit that instructs a commencement of a transaction of bulk OUT transfer in a command transport in response to an instruction on execution of the automatic bulk transfer;

a second circuit that selects either one of execution of a transaction of bulk OUT transfer in a data transport, execution of a transaction of bulk IN transfer in the data transport, or no execution of the data transport, based on information of a transfer direction of the data transport and information regarding presence or absence of the data transport in response to completion of the transaction of the bulk OUT transfer in the data transport commenced by the first circuit;

a third circuit that instructs a commencement of a transaction of the bulk OUT transfer in the data transport, and that instructs a commencement of a transaction of the bulk IN transfer in the data transport, in response to selection of executing the transaction of the bulk IN transfer in the data transport; and a fourth circuit that instructs a commencement of a transaction of the bulk IN transfer in the command transport in response to completion of the bulk OUT transfer and the bulk IN transfer in the data transport;

the transfer controller executing the following transactions in the following order;

the transaction of the bulk OUT transfer in the command transport to automatically send a packet including command block data written in the command block area;

the transaction of one of the bulk OUT transfer and the bulk IN transfer in a data transport to automatically execute one of sending a packet including sending data written in the data area and receiving a packet including receiving data to be written in the data area; and the transaction of the bulk IN transfer in a status transport to automatically receive a packet including status block data to be written in the status block area.

2. The data transfer control device according to claim 1, the transfer controller controlling a transaction of the data transport based on the command block data written in the command block area.

3. The data control device according to claim 2, the transfer controller executing a transaction of the status transport omitting execution of a transaction of the data transport in accordance with a data transfer length of the command block data set to zero.

4. The data transfer control device according to claim 2, the transfer controller deciding, based on the command block data, which one of a transaction of the bulk OUT transfer and a transaction of the bulk IN transfer is executed in the data transport.

5. The data transfer control device according to claim 1, further comprising a channel information register to which channel information of a channel area prepared in the data buffer is set, the data area being prepared as the channel area, the channel information including a maximum packet size and a function address of a device, the transfer controller executing the automatic bulk transfer based on the channel information set in the channel information register.

6. The data transfer control device according to claim 1, further comprising an automatic bulk transfer information register to which an OUT endpoint number designating an endpoint of the bulk OUT transfer and an IN endpoint number designating an endpoint of the bulk IN transfer are set as automatic bulk transfer information, the transfer controller executing: automatically sending a packet including the sending data to the endpoint designated by the OUT endpoint number if the transaction of the bulk OUT transfer is executed in the data transport, and automatically receiving a packet including the receiving data from the endpoint designated by the IN endpoint number if the transaction of the bulk IN transfer is executed in the data transport.

7. The data transfer control device according to claim 1, further comprising an analyzing circuit configured to analyze the status block data received in the status transport to detect an error in the status block data.

8. The data transfer control device according to claim 7, further comprising a processing section, the analyzing circuit notifying the processing section of the error in the status block data if the error is detected in either of a plurality of fields of the status block data.

9. The data transfer control device according to claim 8, the processing section analyzing the status block data written in the status block area in response to the notification of the error in the status block data.

10. The data transfer control device according to claim 1, further comprising a processing section, the transfer controller, upon detection of a transaction error in either one of the command transport, the data transport, and the status transport, stopping execution of the automatic bulk transfer and notifying the processing section of the transport in which the transaction error occurs.

11. The data transfer control device according to claim 1, further comprising:

a processing section, the command block area including a first command block area and a second command block area, and the transfer controller, while the processing section is writing the command block data to either one of the first and the second command block areas, executing the automatic bulk transfer based on the command block data written in the other of the first and the second command block areas.

12. The data transfer control device according to claim 1, the bus being a USB (Universal Serial Bus), and the command transport, the data transport, and the status transport being compliant to the bulk-only transport standard of the mass storage class.

13. An electronic instrument comprising:

the data transfer control device according to claim 1; and a storage device storing data transferred by the data transfer control device.

* * * * *